(12) United States Patent
Rosu

(10) Patent No.: US 11,754,673 B2
(45) Date of Patent: Sep. 12, 2023

(54) CELL-AVERAGE AND ORDERED-STATISTIC OF CELL-AVERAGE CFAR ALGORITHMS FOR LOG DETECTORS

(71) Applicant: NXP USA, Inc., Austin, TX (US)

(72) Inventor: Filip Alexandru Rosu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 324 days.

(21) Appl. No.: 17/124,247

(22) Filed: Dec. 16, 2020

(65) Prior Publication Data

US 2022/0120855 A1  Apr. 21, 2022

(30) Foreign Application Priority Data

Oct. 16, 2020  (RO) ............... a 2020 00649

(51) Int. Cl.
  *G01S 13/931*  (2020.01)
  *G01S 7/41*  (2006.01)
  *G01S 7/292*  (2006.01)
  *G01S 13/524*  (2006.01)
  *G01S 7/40*  (2006.01)

(52) U.S. Cl.
  CPC .......... *G01S 7/4004* (2013.01); *G01S 7/2927* (2013.01); *G01S 7/4052* (2013.01); *G01S 7/414* (2013.01); *G01S 13/5244* (2013.01); *G01S 13/931* (2013.01); *G01S 7/4091* (2021.05);
  (Continued)

(58) Field of Classification Search
  CPC ...... G01S 7/4004; G01S 7/2927; G01S 7/414; G01S 13/5244; G01S 13/931; G01S 7/4091; G01S 7/354; G01S 13/584; G01S 13/34
  See application file for complete search history.

(56) References Cited

U.S. PATENT DOCUMENTS 4,713,664 A * 12/1987 Taylor, Jr. ............ G01S 13/5246
                                              342/91
2010/0073218 A1  3/2010 Stockmann
(Continued)

OTHER PUBLICATIONS

"Constant False Alarm Rate", <https://en.wikipedia.org/wiki/Constant_false_alarm_rate#Cell-averaging_CFAR>; accessed Dec. 31, 2022. (Year: 2018).*

(Continued)

*Primary Examiner* — Donald H B Braswell

(57) ABSTRACT

A vehicle radar system, apparatus and method use a radar control processing unit generate compressed radar data signals, to apply the compressed radar data signals to a log detector to generate log detector sample values, and to generate a first log cell-average constant false alarm rate (CA-CFAR) threshold from the log detector sample values by computing and adding an average sample value $S_{AVG}$ from the log detector sample values, a probability of false alarm factor $\alpha$, and a log CA-CFAR correction factor $\beta$, where the first log CA-CFAR threshold may be used with a second log CA-CFAR threshold to generate an ordered statistics CA-CFAR threshold for the compressed radar data signals by sorting the first and second log CA-CFAR thresholds by magnitude to form a sorted list of log CA-CFAR thresholds, and then selecting a kth threshold from the sorted list of log CA-CFAR thresholds as the OS-CA-CFAR threshold.

20 Claims, 13 Drawing Sheets

(52) U.S. Cl.
CPC .. *G01S 2013/932* (2020.01); *G01S 2013/9322* (2020.01); *G01S 2013/93271* (2020.01)

(56) References Cited

U.S. PATENT DOCUMENTS

| | | | |
|---|---|---|---|
| 2011/0102244 A1* | 5/2011 | Dales | G01S 7/5273 |
| | | | 342/134 |
| 2014/0062760 A1 | 3/2014 | Asada et al. | |
| 2015/0382316 A1 | 12/2015 | Bogatu et al. | |
| 2016/0124086 A1 | 5/2016 | Jansen et al. | |
| 2016/0131752 A1 | 5/2016 | Jansen et al. | |
| 2018/0154484 A1 | 6/2018 | Hall | |
| 2018/0275259 A1 | 9/2018 | Ott et al. | |
| 2020/0025859 A1 | 1/2020 | Kassas et al. | |
| 2020/0136250 A1* | 4/2020 | Cohen | G01S 7/03 |
| 2020/0300972 A1* | 9/2020 | Wang | A61B 5/1126 |

OTHER PUBLICATIONS

El-Darymli et al., "Target Detection in Synthetic Aperture Radar Imagery: A State-of-the-Art Survey," Journal of Applied Remote Sensing, vol. 7, 2013, 36 pages.

Maali et al., "Adaptive CA-CFAR Threshold for Non-Coherent IR-UWB Energy Detector Receivers," IEEE Communications Letters, vol. 13, No. 12, Dec. 2009, 4 pages.

Machado-Fernandez et al., "Evaluation of CFAR Detectors Performance," ITECKNE vol. 14, No. 2, ISSN 1692-1798, ISSN Digital 2339-3483, Dec. 2017, 9 pages.

Hong et al., "Performance Analysis of an Environmental Adaptive CFAR Detector," Mathematical Problems in Engineering, vol. 2014, Article ID 615704, published May 14, 2014, 8 pages.

Shbat et al., "Evaluation of Detection Performance under Employment of the Generalized Detector in Radar Sensor Systems," RadioEngineering, vol. 23, No. 1, Apr. 2014, 16 pages.

Yu et al., "Target Detection with Distributed Terahertz Sensors," International Journal of Distributed Sensor Networks, vol. 2015, Article ID 275676, 2015, 12 pages.

Hansen et al., "Detection Performance of the Cell Averaging LOG/CFAR Receiver," IEEE Transactions on Aerospace and Electronic Systems, vol. AES-8, No. 5, Sep. 1972, 5 pages.

Rohling et al., "OS CFAR performance in a 77 GHz radar sensor for car application," Proceedings of International Radar Conference, Oct. 8-10, 1996, 6 pages.

Richards et al., "Principles of Modern Radar, vol. I: Basic Principles," Copyright 2010 by SciTech Publishing, Raleigh, NC, 4 pages.

* cited by examiner

1100

CELL-AVERAGE AND ORDERED-STATISTIC OF CELL-AVERAGE CFAR ALGORITHMS FOR LOG DETECTORS

BACKGROUND OF THE INVENTION

Field of the Invention

The present invention is directed in general to radar systems and associated methods of operation. In one aspect, the present invention relates to an automotive radar system which uses a constant false alarm rate receiver and associated methods of operation.

Description of the Related Art

Constant False Alarm Rate (CFAR) detection is adaptive algorithm used in radar systems to detect target returns against a background of noise, clutter and interference, and arguably represents the most important radar processing step. CFAR algorithms are used to differentiate between targets and noise, and are characterized by a constant false alarm rate measure of how often noise is classified as a target. Various CFAR algorithms were designed to maximize the probability of detecting a target, given an imposed probability of false alarm.

The CA-CFAR algorithm family is the least complex CFAR algorithm that is suitable for use with systems having low to average computational power, and requires that the input data is a measure of power. Existing CA-CFAR algorithms typically require a square-law detector, such that the probability estimation is done using an exponential distribution. However, a large dynamic range is required for squaring the magnitude of the compressed radar data. For example, when taking the squared magnitude of the compressed-radar signal, the dynamic range will increase by a factor of 2 (e.g., a 16-bit signal will be represented on 32 bits). However, most radar systems do not support such a dynamic range. To solve the dynamic range issue, log detectors may be used to reduce the dynamic range requirements, but with log detectors the noise distribution is no longer exponential, thus changing the way the threshold must be computed, thereby negatively impacting the algorithm's performance. There are currently no direct solutions for finding the threshold, and while previous attempts were done to find the optimal threshold by choosing a different length window, these approaches improve performance only slightly.

The most complex CFAR algorithm is the Ordered Statics (OS) CFAR algorithm which requires that the input data is magnitude sorted. Similar to CA-CFAR, OS-CFAR chooses a threshold based on the input data and a false alarm parameter, which separates noise from target response. Similarly to CA-CFAR, the threshold is computed, for a square-law detector, as the product between a statistic of the data, and the false alarm parameter which determines the probability of false alarm. Unlike CA-CFAR, the statistic is no longer the average of the neighbouring data samples, but is the kth largest sample from the entire input data. Unlike CA-CFAR, OS-CFAR can be used for a large variety of detectors, and the result will be identical, as long as they can be modelled as a monotonic function, such as linear, square-law, log, etc. However, while OS-CFAR is of great interest for systems where more than one target is present in the analyzed signal, the heavy $O(n^2)$ sorting step proves to be a major issue in real-time applications, such as automotive radar systems. While there are ways to overcome this issue by randomly under-sampling the signal in the OS-CFAR algorithm, this will have a negative effect on performance. Another common approach is to use windowing with OS-CFAR where the kth largest sample is used instead of using the average as a statistic, but this approach also has performance limitations. For example, with conventional OS-CFAR, an input data signal may be a Range-Doppler Matrix R(m,n) having M Doppler bins and N range bins which is processed for peak detection by applying 1D OS-CFAR for each dimension. By considering just the sorting step of the OS-CFAR, this would require $MN^2+NM^2$ computations. For a square matrix, this leads to $2N^3$ computations which may be impractical for certain systems. While various simplifications can be done, such as a sliding window OS-CFAR or randomly selected K samples OS-CFAR, these impose a heavy cost in performance. As a result, even though OS-CFAR algorithms are suitable for multi-target automotive radar applications, their increased complexity and substantial computational power requirements result in many systems sticking with lower performing CA-CFAR algorithms.

As seen from the foregoing, the existing CFAR receiver processing solutions are extremely difficult at a practical level by virtue of the balancing performance, complexity, and computational requirements when quickly, accurately, and efficiently identifying one or more radar targets with radar system applications.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
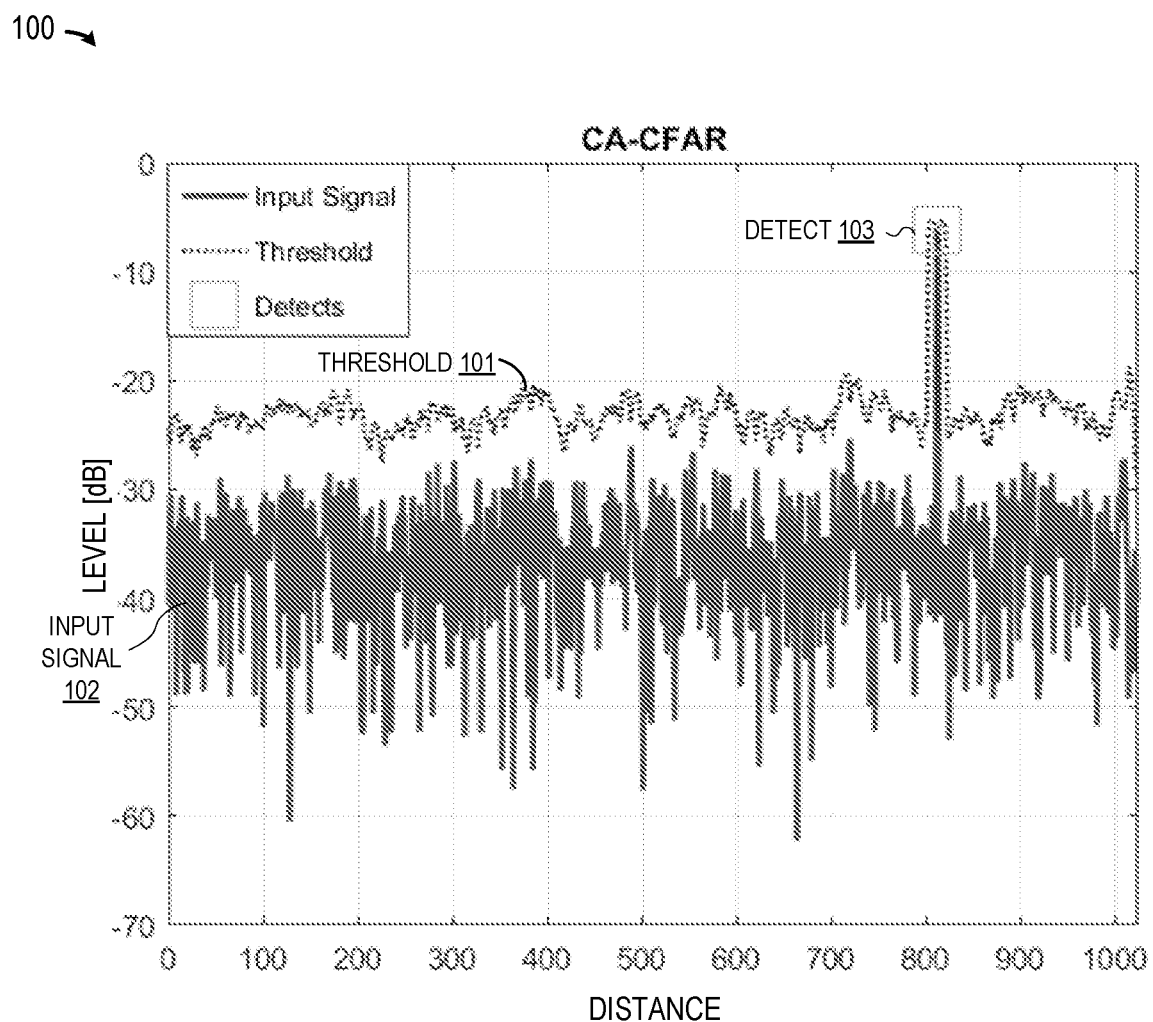
FIG. 1 depicts an example range profile for a CA-CFAR threshold that is applied to an input signal for detecting targets in a radar system.

A radar system, apparatus, and methodology are described for detecting one or more targets with a cell average-constant false alarm rate log detector by optimizing the results of a log-law detector with a log CA-CFAR correction factor so that the threshold for the optimal probability of false alarm can be computed with a log detector that reduces the dynamic range requirements from that of a square law detector while improving the probability of detection to be close to that of the much more computationally exhaustive OS-CFAR approaches. In selected embodiments, the log CA-CFAR correction factor is applied to directly map the distribution of the log-detector to the distribution of the squared-law detector, such that the threshold for the optimal probability of false alarm can be computed. To this end, the target detecting radar system, apparatus, and method may include a CA-CFAR log detector which processes an input data stream with a radar pulse compressor and log detector to compute log detector sample values $\lambda=\log(z)$ for storage in a buffer window. In addition, the CA-CFAR log detector may include a CA-CFAR threshold calculating unit that calculates a CA-CFAR threshold by first computing, for each cell under test, an average sample value from the plurality of i=1-N nearest sample values $\lambda_i=\log(z_i)$, and to sum the average sample value with a computed probability of false alarm factor ($\alpha=\log(N[P_{FA}^{-1/N}-1])$) and a log CA-CFAR correction factor ($\beta=\frac{1}{2}\log(\pi)$). In addition, the CA-CFAR log detector may include a detector unit that compares each cell under test with the corresponding CA-CFAR threshold to detect targets from any input data that exceeds the CA-CFAR threshold.

In other embodiments, the CA-CFAR log detector may be deployed to compute an OS-CFAR threshold with low computational costs by grouping or dividing the log detector samples into a plurality of m non-overlapping subsets or windows. For example, a 512 sample range profile may be divided into m=32 windows, each having 16 samples. Once divided into sample subsets/windows, the m sample subsets are used to compute a corresponding plurality of m log CA-CFAR thresholds which are then sorted to select the kth largest log CA-CFAR threshold value as the OS-CFAR threshold. By grouping the input data samples into a plurality of windows, the process avoids the computational complexity of a sliding window. To this end, the target detecting radar system, apparatus, and method may include an OS-CFAR log detector which processes an input data stream with a radar pulse compressor and log detector to compute log detector sample values $\lambda=\log(|x|^2)$ for storage in a buffer window. In addition, the OS-CFAR log detector may include an OS-CFAR threshold calculating unit that groups the log detector samples into separate sample subsets and then computes, from the sample values in each sample subset, an average sample value. In addition, the OS-CFAR threshold calculating unit adds each average sample value with a computed probability of false alarm factor ($\alpha=\log(N[P_{FA}^{-1/N}-1])$) and a log CA-CFAR correction factor ($\beta=\frac{1}{2}\log(\pi)$) to compute a CA-CFAR threshold for each sample subset. The OS-CFAR log detector may also include a sorting unit for selecting the kth largest CA-CFAR threshold that is provided as the OS-CFAR threshold. In addition, the OS-CFAR log detector may include a detector unit that compares each log detector sample with the OS-CFAR threshold to detect targets from any input data that exceeds the OS-CFAR threshold. As a result, the disclosed OS-CFAR algorithm provides an extremely accurate estimate of the true threshold, both in sparse profiles and profiles with many detections. And by using log data in computing the CA-CFAR thresholds in the disclosed OS-CA-CFAR algorithm, the dynamic range requirements and numerical complexity are greatly reduced such that it may run in real time. By using an OS-CFAR process to sort local CA-CFAR thresholds and select a kth local CA-CFAR threshold as the optimal threshold for a given probability of false alarm of an M by N 2D radar image, the OS-CFAR process requires only requiring $M(N+K^2)+N(M+K^2)$ computations, where K is a submultiple of N and M (e.g., N=M=8K). This leads to a complexity of $$2N\left(N+\frac{N^2}{64}\right) \cong \frac{N^3}{32},$$

resulting in a complexity gain of 64 compared to the traditional OS-CFAR, which would require $2N^3$ computations. Depending on the sparsity of the Range-Doppler-Matrix or signal under test, and the sample size, this complexity gain may be further improved.

In the context of the present disclosure, it will be appreciated that constant false alarm rate (CFAR) detection refers to an adaptive algorithm used in radar systems to detect target returns against a background of noise, clutter and interference. The role of the constant false alarm rate circuitry is to determine the power threshold above which any return can be considered to probably originate from a target. If this threshold is too low, then more targets will be detected at the expense of increased numbers of false alarms, resulting in a high false alarm rate. Conversely, if the threshold is too high, the false alarm rate will be low, but fewer targets will be detected. In most radar detectors, the threshold is set in order to achieve a required probability of false alarm (or equivalently, false alarm rate or time between false alarms). If the background against which targets are to be detected is constant with time and space, then a fixed threshold level can be chosen that provides a specified probability of false alarm. However, in most fielded systems, unwanted clutter and interference sources mean that the noise level changes both spatially and temporally. In such cases, a changing threshold can be used so that the threshold level is raised and lowered to maintain a constant probability of false alarm. This is known as constant false alarm rate (CFAR) detection. In most CFAR detection schemes, the threshold level is calculated by estimating the level of the noise floor around the cell under test (CUT). This can be found by taking a block of cells around the CUT and calculating the average power level, typically by ignoring the "guard cells" immediately adjacent to the CUT to avoid corrupting this estimate with power from the CUT itself. Once the threshold level is calculated as the local average power level, a target is detected at the CUT if it is both greater than all its adjacent cells and greater than the threshold level. This simple approach is called a cell-averaging CFAR (CA-CFAR). Other related approaches calculate separate averages for the cells to the left and right of the CUT, and then use the greatest-of or least-of these two power levels to define the local power level. These are referred to as greatest-of CFAR (GO-CFAR) and least-of CFAR (LO-CFAR) respectively, and can improve detection when immediately adjacent to areas of clutter.

To provide additional details for an improved contextual understanding of the present disclosure, reference is now made to FIG. 1 which depicts an example range profile 100 for a computed CA-CFAR threshold 101 that is applied to an input signal 102 for detecting targets 103 in a radar system. As will be appreciated, the CFAR algorithm used to compute the CA-CFAR threshold 101 is designed to find a threshold which will distinguish the peaks 103 generated by targets from the peaks generated by the input signal noise 102. Generally speaking, the threshold is the product of (1) the probability of false alarm $P_{FA}$ using the a priori known noise distribution and (2) a higher statistic of the signal, such as noise variance $\sigma^2$. To detect targets 103 from the input signal 102, the CFAR algorithm sequentially compares each sample, or cell under test (CUT), to the CA-CFAR threshold 101 which is computed as the average value of its neighbors. If the amplitude of the CUT is larger than the average, than it is classified as a detection.

When calculating and applying CA-CFAR threshold 101, the noise samples present in the In-phase and Quadrature (IQ) signal must be independent and identically distributed (IID), and must obey a zero mean normal distribution law. In addition, coherent integration, also referred to as radar compression or simply compression, is done via matched filtering for pulsed radars or fast Fourier transform (FFT) for frequency modulated continuous wave (FMCW) modulation radars. In addition, the IQ signal must be passed through a square law detector. Finally, target returns should not be present in the adjacency of the CUT.

Figure 2:
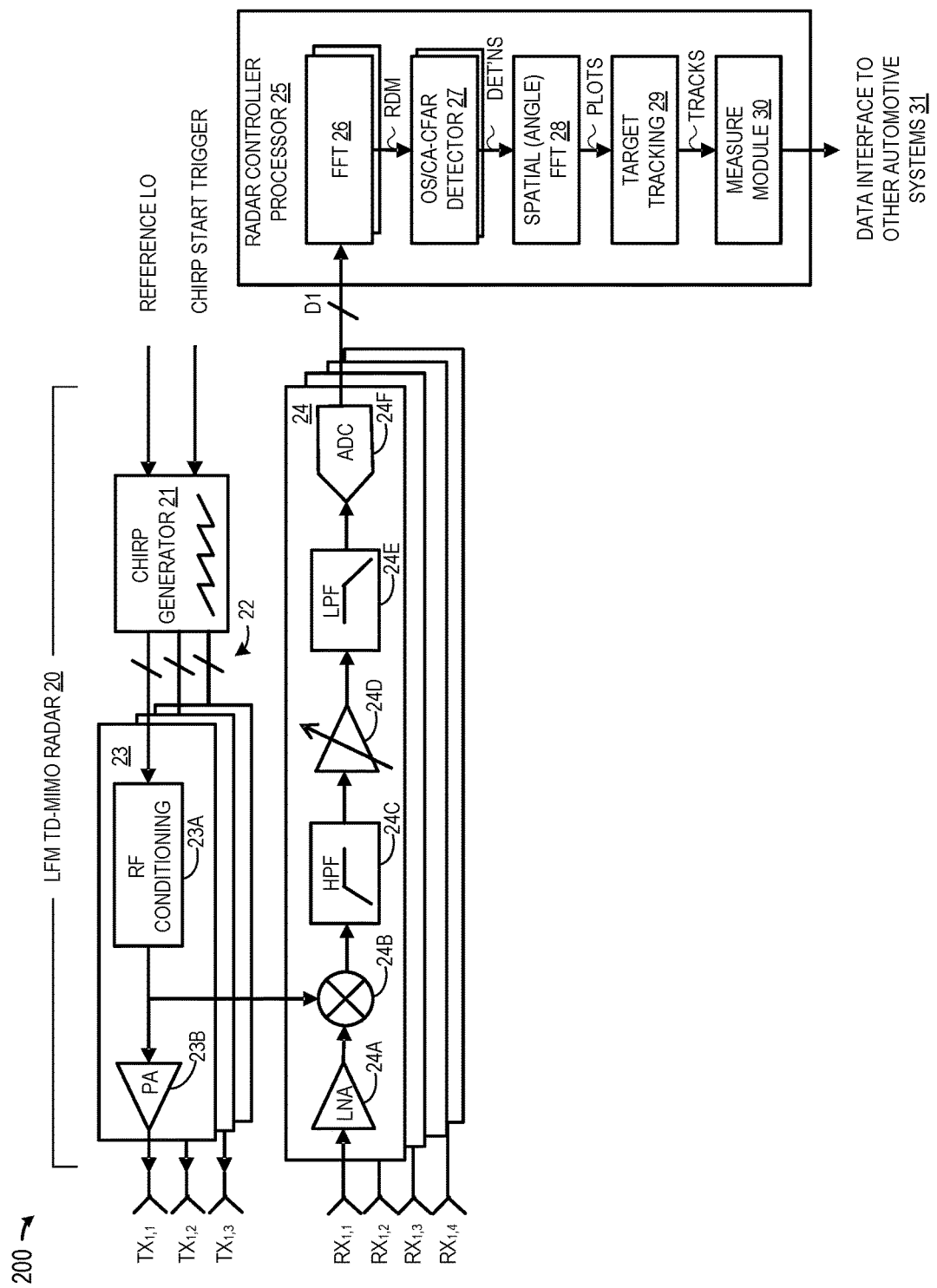
FIG. 2 is a simplified schematic block diagram of an LFM TD-MIMO automotive radar system in accordance with selected embodiments of the present disclosure.

To illustrate the design and operation of a TD MIMO radar system in which a CA-CFAR log detector is used to detect target returns, reference is now made to FIG. 2 which depicts a simplified schematic block diagram of a Linear Frequency Modulation (LFM) time-division multiple-input, multiple output (TD-MIMO) automotive radar system 200 which includes an LFM TD-MIMO radar device 20 connected to a radar controller processor 25. In selected embodiments, the LFM TD-MIMO radar device 20 may be embodied as a line-replaceable unit (LRU) or modular component that is designed to be replaced quickly at an operating location. Similarly, the radar controller processor 25 may be embodied as a line-replaceable unit (LRU) or modular component. Although a single or mono-static LFM TD-MIMO radar device 20 is shown, it will be appreciated that additional distributed radar devices may be used to form a distributed or multi-static radar. In addition, the depicted radar system 200 may be implemented in integrated circuit form with the LFM TD-MIMO radar device 20 and the radar controller processor 25 formed with separate integrated circuits (chips) or with a single chip, depending on the application.

Each radar device 20 includes one or more transmitting antenna elements $TX_i$ and receiving antenna elements $RX_j$ connected, respectively, to one or more radio-frequency (RF) transmitter (TX) units 23 and receiver (RX) units 24. For example, each radar device (e.g., 20) is shown as including individual antenna elements (e.g., $TX_{1,i}$, $RX_{1,j}$) connected, respectively, to three transmitter modules (e.g., 23) and four receiver modules (e.g., 24), but these numbers are not limiting and other numbers are also possible, such as four transmitter modules 23 and six receiver modules 24, or a single transmitter module 23 and/or a single receiver module 24. Each radar device 20 also includes a chirp generator 21 which is configured and connected to supply a chirp input signal to the transmitter module(s) 21. To this end, the chirp generator 21 is connected to receive a separate and independent local oscillator (LO) signal and a chirp start trigger signal, though delays are likely to be different due to the signal path differences and programmable digital delay elements in the signal paths. Chirp signals are generated and transmitted to multiple transmitters 23, usually following a pre-defined transmission schedule, where they are filtered at the RF conditioning module 23A and amplified at the power amplifier 23B before being fed to the corresponding transmit antenna $TX_{1,i}$ and radiated. By sequentially using each transmit antenna $TX_{1,i}$ to transmit successive pulses in the chirp signal, each transmitter element 23 operates in a time-multiplexed fashion in relation to other transmitter elements because they are programmed to transmit identical waveforms on a temporally separated schedule.

The radar system 200 also includes a radar controller processing unit 25 that is connected to supply input control signals to the radar device 20 and to receive therefrom digital output signals D1 generated by the receiver modules 24. In selected embodiments, the radar controller processing unit 25 may be embodied as a micro-controller unit (MCU) or other processing unit that is configured and arranged for signal processing tasks such as, but not limited to, target identification, computation of target distance, target velocity, and target direction, and generating control signals. The radar controller processing unit 25 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences. In addition, the radar controller processor 25 may be configured to program the transmitter modules 24 to operate in a time-division fashion by sequentially transmitting LFM chirps for coordinated communication between the transmit antennas $TX_{1,i}$, $RX_{1,j}$.

In the example shown, each chirp generator 21 generates a chirp signal 22 in response to a chirp start trigger signal and a corresponding reference local oscillator signal (Reference LO). The resulting chirp signal 22 from each chirp generator 21 is then processed by the RF conditioning unit 23A and amplified at the power amplifier (PA) 23B which amplifies the signal to a level suitable for transmission as a radar signal by a transmitter antenna unit $TX_{1,i}$, $TX_{2,i}$.

Though not shown, it will be understood that the transmitter module 23 may include additional processing circuits, such as a digital-to-analog converter (DAC), phase shifter (or phase rotator), buffer, mixer, filter, and the like.

The radar signal transmitted by the transmitter antenna unit $TX_{1,i}$ may be reflected by an object, and part of the reflected radar signal reaches the receiver antenna units $RX_{1,i}$ at the radar device 20. At each receiver module 24, the received (radio frequency) antenna signal is amplified by a low noise amplifier (LNA) 24A and then fed to a mixer 24B where it is mixed with the transmitted chirp signal generated by the RF conditioning unit 23A. The resulting intermediate frequency signal is fed to a first high-pass filter (HPF) 24C. The resulting filtered signal is fed to a first variable gain amplifier 24D which amplifies the signal before feeding it to a first low pass filter (LPF) 24E. This re-filtered signal is fed to an analog/digital converter (ADC) 24F and is output by each receiver module 24 as a digital signal D1. At the radar controller 25, the digital signal D1 is processed by the radar modules 25-30 to detect and measure target returns. In particular, the digital output signals D1 generated by the receiver module 24 may be processed with radar modules 25-30 to construct and accumulate multiple-input multiple-output (MIMO) array outputs to form a MIMO aperture for use in computing the plots generated by the spatial (angle) FFT module 28 and target tracks generated by the target tracking module 29. For example, the digital output signals D1 may be processed by one or more fast Fourier transform (FFT) modules 26, such as a fast-time (range) FFT module and slow-time (Doppler) FFT module, thereby generating the range-Doppler map (RDM). In turn, the RDM outputs are then passed through one or more CFAR detection modules 27 to obtain the range-Doppler peak detections. As described more fully hereinbelow, the CFAR detection modules 27 may be embodied as a CA-CFAR detector or an OS-CA-CFAR detector. In either case, the detected peaks may be further processed at the spatial angle estimation module 28, target tracking module 29, and measurement module 30, with the result being output 31 to other automotive computing or user interfacing devices for further process or display.

With the depicted frequency modulated continuous wave (FMCW) modulation radar system 200, the digital output signal D1 is evaluated to detect target returns by first generating a range-compressed signal under test. In particular, the range compressed signal may be generated at the FFT module 26 by taking the Fourier Transform of the complex output from the ADC 24F. Depending on whether there are targets present, there are two possible outcomes from generating the range-compressed signal under test.

In the first outcome where there are no targets present, the reflected radar signal may be characterized by the following model:

$$y = I_w + jQ_w \quad (1)$$

where $I_w$ and $Q_w$ are random variables (r.v.) characterized by a Normal distribution $$N\left(0, \frac{\sigma_w^2}{2}\right).$$

If the reflected radar signal y is processed by a linear detector, the linear detector output gives the magnitude of y, which will result in a r.v. having a Rayleigh distributed probability density function (PDF). However, if the reflected radar signal y is processed by a square law detector, the resulting square law detector output $z=|y|^2$, and will have an exponential probability density function:

$$p_Z(z) = \begin{cases} \dfrac{1}{\sigma_w^2}\exp\left(\dfrac{-z}{\sigma_w^2}\right), & z \geq 0 \\ 0, & z < 0 \end{cases} \quad (2)$$

where $\sigma_w^2$ represents the noise variance.

In the second outcome where there are targets present, the reflected radar signal generates a square law detector output having the following post-detector signal probability density function:

$$p_Z(z) = \begin{cases} \dfrac{1}{\sigma_w^2 + \sigma_T^2}\exp\left(\dfrac{-z}{\sigma_w^2 + \sigma_T^2}\right), & z \geq 0 \\ 0, & z < 0 \end{cases} \quad (3)$$

where $\sigma_T^2$ represents the signal's peak power after coherent integration.

Equation (3) can be re-written in terms of the SNR=$\sigma_T^2/\sigma_w^2$ as:

$$p_Z(z) = \begin{cases} \dfrac{1}{\sigma_w^2(1+SNR)}\exp\left(\dfrac{-z}{\sigma_w^2(1+SNR)}\right), & z \geq 0 \\ 0, & z < 0 \end{cases} \quad (4)$$

With this understanding of the outcomes from generating the range-compressed signal under test, the CA-CFAR detector module 27 is configured to set the threshold $T_{CA}$ based on the noise variance $\sigma_w^2$ and the desired probability of false alarm $P_{FA}$. In practice however, the noise variance aw is unknown and must be estimated. Under the assumption that there is no target present in the reference window consisting of N samples, the PDF at the square law detector output has the following form:

$$p_Z(z) = \frac{1}{\sigma_w^2}\exp\left(\frac{-z}{\sigma_w^2}\right). \quad (5)$$

In turn, the joint PDF of the N samples at the output is given by:

$$p_Z(z_n \mid \sigma_w^2) = \frac{1}{(\sigma_w^2)^N}\exp\left(\sum_{n=1}^{N}\frac{-z_n}{\sigma_w^2}\right). \quad (6)$$

The maximum likelihood estimate of the noise variance aw is obtained by setting $$\frac{\partial \log(p_Z(z_n \mid \sigma_w^2))}{\partial \sigma_w^2} = 0,$$

and computing $\sigma_w^2$ as the mean of the noise samples:

$$\hat{\sigma}_w^2 = \frac{1}{N}\sum_{n=1}^{N} z_n. \quad (7)$$

As a result, the CA-CFAR threshold $T_{CA}$ may be computed as:

$$T_{CA} = \hat{\sigma}_w^2 \alpha_{CA}, \quad (8)$$

where $\alpha_{CA}$ is a scaling constant depending on the desired probability of false alarm $P_{FA}$.

For a given $T_{CA}$, the probability of detection is:

$$P_D = \int_{T_{CA}}^{\infty} \frac{1}{\sigma_w^2(1+SNR)} \exp\left(\frac{-z}{\sigma_w^2(1+SNR)}\right). \quad (9)$$

Since the noise variance $\hat{\sigma}_w^2$ is a random variable, the computed probability of detection $\hat{P}_D(z)$ is also a random variable:

$$\hat{P}_D(\hat{\sigma}_w^2) = \exp\left(\frac{-T_{CA}}{\hat{\sigma}_w^2(1+SNR)}\right). \quad (10)$$

The average probability of detection $\overline{P}_D$ is obtained by taking the average with respect to the distribution of $\hat{\sigma}_w^2$:

$$\overline{P}_D = E\{\hat{P}_D(\hat{\sigma}_w^2)\} \rightarrow \int_0^{\infty} \hat{P}_D(\hat{\sigma}_w^2) p_{\hat{\sigma}_w^2}(\hat{\sigma}_w^2) d\hat{\sigma}_w^2, \quad (11)$$

where the $p_{\hat{\sigma}_w^2}(\hat{\sigma}_w^2)$ was chosen to model a Swerling 1 or 2 target.

As will be understood by those having ordinary skill in the art, the average value for the probability of detection $\overline{P}_D$ may be computed as:

$$\overline{P}_D = \left[1 + \frac{\alpha_{CA}/N}{(1+SNR)}\right]^{-N}. \quad (12)$$

And by setting the SNR to zero, the average probability of false alarm $\overline{P}_{FA}$ may be computed as:

$$\overline{P}_{FA} = \left[1 + \frac{\alpha_{CA}}{N}\right]^{-N}. \quad (13)$$

Solving for $\alpha_{CA}$, the scaling constant value may be computed as:

$$\alpha_{CA} = \alpha_{CA}\hat{\sigma}_w^2 = [P_{FA}^{-1/N} - 1]. \quad (14)$$

Finally, by combining equations 8, 7, and 14, the analytical solution for the traditional CA-CFAR threshold $T_{CA}$ is:

$$T_{CA} = \alpha_{CA}\hat{\sigma}_w^2 = [P_{FA}^{-1/N} - 1]\Sigma_{n=1}^{N} z_n. \quad (15)$$

One of the problems with classic CA-CFAR computations is the difficulty of using a log detector to compute the CA-CFAR threshold $T_{CA}$ while maintaining the performance of a square-law detector. In particular, the log detector output has the form $\lambda = \log(z)$, where $z = |y|^2$. In order to maintain the same performance as for a square-law detector, the following statement must be true for the CA-CFAR log threshold:

$$T_{CA\_log} = \log(T_{CA}) = \log(\alpha_{CA}) + \log(\hat{\sigma}_w^2). \quad (16)$$

While the scaling value $\alpha_{CA}$ is a constant that can be easily mapped to compute $\log(\alpha_{CA})$, the problem is that the noise is no longer exponentially distributed at the log detector output, meaning that the noise variance $\hat{\sigma}_w^2$ can no longer be estimated using Equation 7. While the maximum likelihood estimate of the noise variance $\hat{\sigma}_w^2$ could theoretically be derived from the PDF $p_\Lambda(\lambda)$ at the log detector output, this would require transforming the data back to its squared magnitude form, which defeats the practical purpose of a having a log detector.

Another approach for finding the CA-CFAR log threshold $T_{CA\_log}$ is to analyze the log data and find a new solution based on the PDF $p_\Lambda(\lambda)$. In order to find $p_\lambda(\lambda)$, the following repartition function was used:

$$P(Z \le z) = P(\Lambda \le \lambda) = P(A \le \log(z)). \quad (17)$$

The equivalent PDF function is:

$$\int_Z^{\infty} p_Z(z)dz = \quad (18)$$

$$\int_\lambda^{\infty} p_\Lambda(\lambda)d\lambda \rightarrow \int_\lambda^{\infty} p_Z(e^\lambda)\left|\frac{\partial z}{\partial \lambda}\right|d\lambda \text{ where } \left|\frac{\partial z}{\partial \lambda}\right|$$

is the Jacobian of the transformation. Since the second and third integrals in Equation 18 have the same integration limits and variables, their integrand functions must also be equal:

$$p_\Lambda(\lambda) = p_Z(e^\lambda)\left|\frac{\partial z}{\partial \lambda}\right| \rightarrow \frac{1}{\sigma_w^2}\exp\left(-\frac{\exp(\lambda)}{\sigma_w^2} + \lambda\right) \quad (19)$$

Similarly as in the classic CA-CFAR, the PDF $p_\lambda(\lambda)$ is a random variable depending on the noise variance $\sigma_w^2$. However, for the current distribution, there is no analytical solution for the average probability, meaning that $T_{CA\_log}$ cannot be directly derived from the PDF $p_\Lambda(\lambda)$.

Since one cannot compute the CA-CFAR log threshold $T_{CA\_log}$ analytically based on $p_\Lambda(\lambda)$, the present disclosure provides a method of indirectly estimating the CA-CFAR log threshold $T_{CA\_log}$ using Equations (16) and (19). In particular, Equation (16) specifies that the CA-CFAR log threshold $T_{CA\_log}$ is the sum of two terms, $\log(\alpha_{CA})$ and $\log(\hat{\sigma}_w^2)$. In addition, Equation (16) specifies that the scaling constant value $\alpha_{CA}$ is computed using $p_Z(z)$ as in the squared-law detector case.

In order to estimate the noise variance $\hat{\sigma}_w^2$, the maximum likelihood estimate is obtained from $$\frac{\partial \log(p_\Lambda(\lambda_n \mid \sigma_w^2))}{\partial \sigma_w^2} = 0:$$

$$\hat{\sigma}_w^2 = \frac{1}{N}\sum_{n=1}^{N} \exp(-\lambda_n). \quad (20)$$

As will be appreciated, in order to compute an estimate of the noise variance $\hat{\sigma}_w^2$, one must compute $\exp(-\lambda_n)$ which is not of interest due to dynamic range constraints. However, if the noise variance $\hat{\sigma}_w^2$ is considered to be the average of the samples in the log domain:

$$\hat{\sigma}_{w,Log}^2 = \frac{1}{N}\sum_{n=1}^{N}\lambda_n = \frac{1}{N}\sum_{n=1}^{N}\log(z_n), \quad (21)$$

it becomes clear that it differs from:

$$\log(\hat{\sigma}_w^2) = \log\left(\frac{1}{N}\sum_{n=1}^{N}z_n\right) \quad (22)$$

which is equivalent to a geometric mean in the square-law domain, instead of the arithmetic mean. This discrepancy has a negative effect on the CA-CFAR algorithm. While conventional solutions have proposed to address this discrepancy by increasing the window size from N to 1.65N+0.65, this has a limited effect on small windows since the result must be integer. In addition, such a solution offers incorrect results when multiple targets are present.

To address these limitations from conventional solutions and others known to those skilled in the art, the CA-CFAR detector 27 is configured to provide a true mapping of $\hat{\sigma}_{w,Log}^2$ to $\log(\hat{\sigma}_w^2)$ such that $T_{CA\_log}$ may be optimally computed. To enable the true mapping, the statistic of interest is $\hat{\sigma}_{w,Log}^2$ which is computed as the average of the PDF $p_\Lambda(\lambda)$:

$$\hat{\sigma}_{w,Log}^2 = \int_{-\infty}^{\infty}\lambda p_\Lambda(\lambda)d\lambda. \quad (23)$$

By curve-fitting the histograms of the two PDFs, $\int_{-\infty}^{\infty}\lambda p_\Lambda(\lambda)d\lambda$ and $\int_{0}^{\infty}z\, p_Z(z)dz$, the following result was obtained:

$$\int_{-\infty}^{\infty}\lambda p_\Lambda(\lambda)d\lambda + \tfrac{1}{2}\log(\pi) = \log(\int_{0}^{\infty}z\, p_Z(z)dz). \quad (25)$$

From the relation in Equation (25), $\hat{\sigma}_{w,Log}^2$ may be directly mapped to $\log(\hat{\sigma}_w^2)$ as:

$$\log(\hat{\sigma}_w^2) \overset{def}{=} \log\left(\frac{1}{N}\sum_{n=1}^{N}z_n\right) = \frac{1}{N}\sum_{n=1}^{N}\lambda_n + \frac{1}{2}\log(\pi). \quad (26)$$

As will be appreciated, the Equation (26) only holds true if $z_n$ is an exponentially distributed random variable, $\lambda_n = \log(z_n)$, and if $N \to \infty$. For practical purposes, as long as N is greater than 8, the approximation will have little effect on performance.

Using the direct mapping function provided in Equation (26), the log CA-CFAR threshold $T_{Log\_CA}$ may be computed as:

$$T_{Log\_CA} = \log(N[P_{FA}^{-1/N} - 1]) + \frac{1}{N}\sum_{n=1}^{N}\lambda_n + \frac{1}{2}\log(\pi). \quad (27)$$

The disclosed log CA-CFAR threshold $T_{Log\_CA}$ perfectly matches the squared-law threshold in an CA-CFAR scenario. In contrast, the existing algorithm estimates the threshold approximately 3 dB lower, which has a major impact on the probability of false alarm $P_{FA}$.

Stated more generally, the computation of the log CA-CFAR threshold $T_{Log\_CA}$ holds for any base, b, of the logarithm:

$$T_{Log\_CA} = \log(N[P_{FA}^{-1/N} - 1])\log_b e + \frac{1}{N}\sum_{n=1}^{N}\lambda_n + \frac{1}{2}\log(\pi)\log_b e \quad (28)$$

Figure 3:
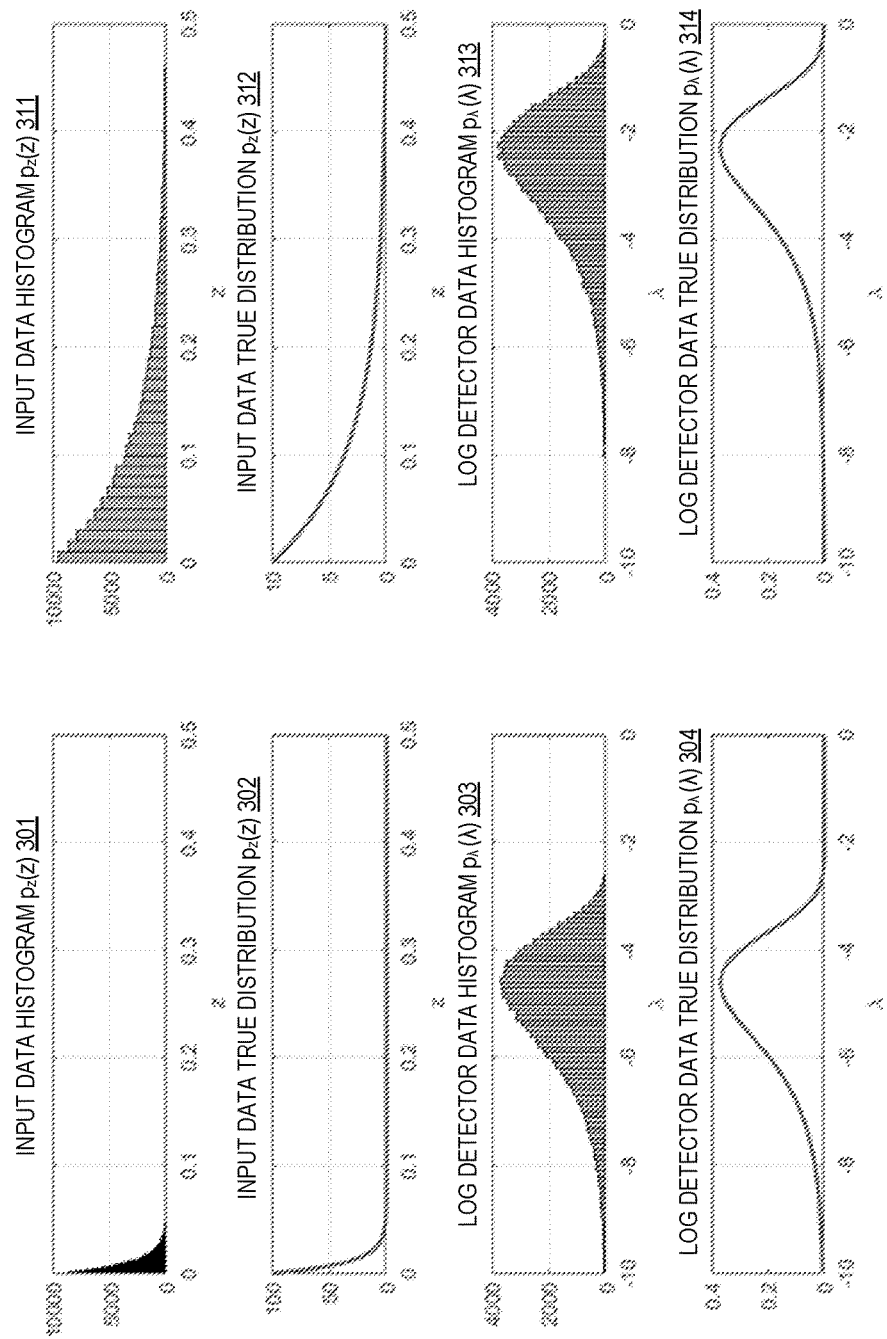
FIG. 3 depicts histograms and probability density functions for input data processed by a square-law detector and a log detector where no targets are present.

To visually illustrate the basis for generating these equations, reference is now made to FIG. 3 which depicts the comparative histograms and probability density functions 300 for input data processed by a square-law detector and by a log detector where no targets are present. In the simulated examples, a 10000 sample random process was generated using MATLAB, and the resulting histograms and distributions were simulated using a noise variance $\sigma_w^2=0.01$ (on the left side) and a noise variance $\sigma_w^2=0.1$ (on the right side). With the random samples passed through a square-law detector, the resulting simulated input data histograms 301, 311 illustrate the distribution of input data samples versus the square-law detector output z, and the input data true PDF 302, 312 illustrate the PDF for the square-law detector output z. And upon further transformation by the log detector, the simulated log detector data histograms 303, 313 illustrate the histogram of log detector values, while the log detector data true PDF 304, 314 illustrate the PDF for the log detector values. As can be seen, the PDF (e.g., 304) perfectly match the data histograms (e.g., 303). Another interesting result is that the PDF $p_\Lambda(\lambda)$ 304, 314 have a constant variance (spread), with the change in the noise variance $\sigma_w^2$ in $p_Z(z)$ resulting only in a change in the mean of the PDF $p_\Lambda(\lambda)$. For example, the mean of the PDF $p_\Lambda(\lambda)$ 314 being greater than the mean of the PDF $p_\Lambda(\lambda)$ 304. The probability of false alarm $P_{FA}$ is defined as the area under the curve 304, 314 between the threshold $T_{CA}$ (or log CA-CFAR threshold $T_{Log\_CA}$) and infinity.

Figure 4:
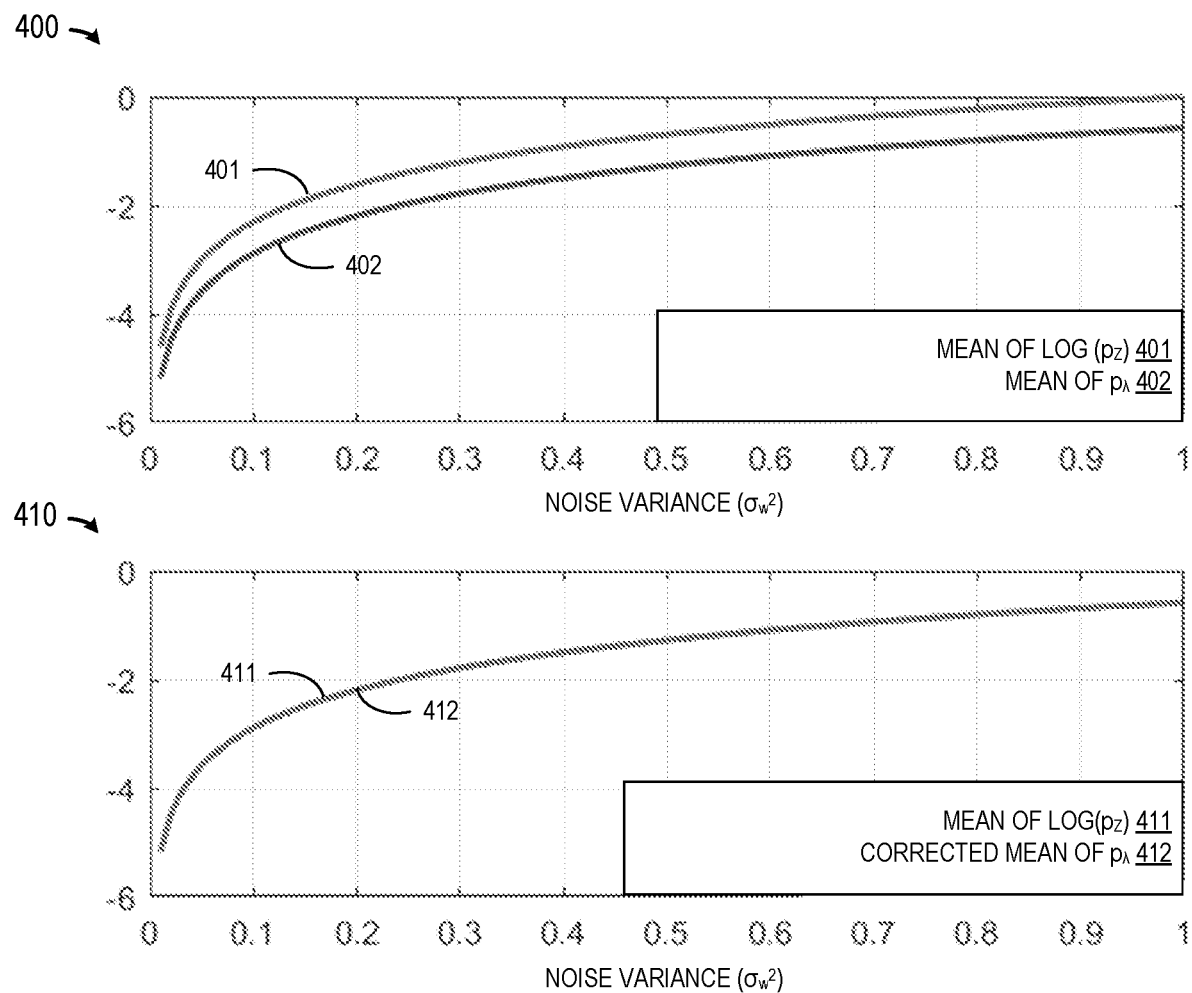
FIG. 4 graphically depicts the log of a CA-CFAR square law detector output, CA-CFAR log detector output, and corrected CA-CFAR log detector output as a function of noise variance in accordance with selected embodiments of the present disclosure.

To provide a further visual illustration of the correction factor for computing the log CA-CFAR threshold $T_{Log\_CA}$, reference is now made to FIG. 4 which graphically depicts the discrepancy in Equation (25) between the terms $\log(\int_0^\infty z\, p_Z(z)dz)$ and $\int_{-\infty}^{\infty}\lambda\, p_\Lambda(\lambda)d\lambda$ which can be corrected by the offset value ½ $\log(\pi)$. In the top simulation 400, $\int_0^\infty z\, p_Z(z)dz$ is represented by the mean or average value of $\log(p_z)$ 401 which is plotted as a function of the noise variance $\sigma_w^2$, and $\int_{-\infty}^{\infty}\lambda\, p_\Lambda(\lambda)d\lambda$ is represented by the uncorrected mean or average value of $p_\lambda$ 402 which is plotted as a function of the noise variance $\sigma_w^2$. By plotting the mean values 401, 402 from the two distributions, $\int_{-\infty}^{\infty}\lambda\, p_\Lambda(\lambda)d\lambda$ and $\log(\int_0^\infty z\, p_Z(z)dz)$, it can be determined that an offset value ½ $\log(\pi)$ separates the plots 401, 402. In the bottom simulation 410, the offset value ½ $\log(\pi)$ is applied as a correction factor to the mean of $p_\lambda$ plot to generate a corrected mean of $p_\lambda$ plot 412 which matches closely with the mean of $\log(p_z)$ 411.

Figure 5:
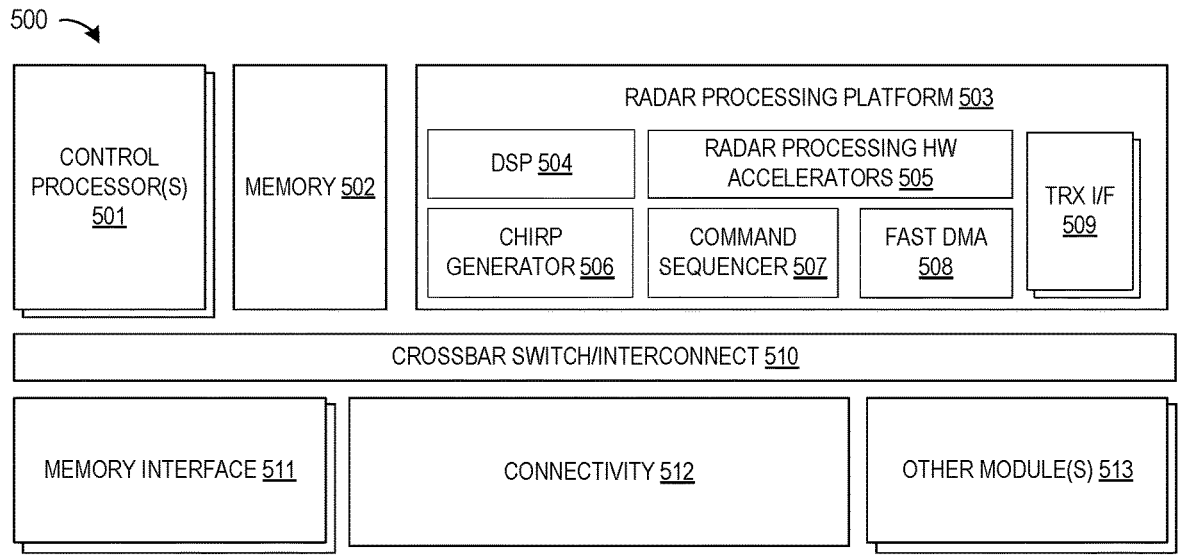
FIG. 5 is a simplified architectural block diagram of a microcontroller system for automotive and industrial high-performance radar applications in accordance with selected embodiments of the present disclosure.

To provide additional details for an improved understanding of selected embodiments of the present disclosure, reference is now made to FIG. 5 which illustrates a simplified architectural block diagram of a microcontroller 500 for automotive and industrial high-performance radar applications which may implement the disclosed system, apparatus, and methodology for detecting one or more targets with a cell average-constant false alarm rate log detector. As depicted, the microcontroller 500 includes one or more control processor or central processing unit (CPU) subsystems 501, on-chip memory 502 (e.g., volatile or non-volatile memory), and radar processing platform 503 for providing radar-specific high throughput signal processing. For example, the radar processing platform 503 may include one or more digital signal processor (DSP) cores 504, one or more radar processing hardware accelerators 505, chirp generator 506, command sequencer 507, fast direct memory access (DMA) unit 508, and a transceiver interface 509 to provide transmit and receive module control and processing. The processor(s) 501, on-chip memory 502, and radar processing platform 503 may be connected over an on-chip interconnect 510 to a memory interface 511, (e.g., DDR interface), one or more connectivity modules 512 (e.g., PCIe 2x, FlexPWM, eTimer, IIC, DSPI, etc.), and other modules 513. In selected embodiments, the microcontroller 500 may be implemented as circuitry on a single integrated circuit or system-on-chip (SoC). In addition, the interconnect 510 can be any type of bus structure, including but not limited to a non-coherent interconnect, an advanced high-performance bus (AHB), or an advanced peripheral bus (APB). In addition, the control processor(s) 501 may be any type of processing circuit, including but not limited to a microprocessor (MPU), microcontroller (MCU), digital signal processor (DSP), or another type of processor or processor core with multiple levels of cache memory. Though not shown, the microcontroller 500 may include peripheral devices or special-purpose processors, communication interfaces, timers, encoders/decoders, and one or more external memory interfaces, such as DDR interface or flash interface. In turn, the external memory interfaces may be connected to external memory, such as DDR memory or flash memory.

As disclosed, the microcontroller 500 may use the control processor(s) 601 to provide a signal processing toolbox (SPT) which receives digital output signals from the radar processing platform 503 which uses the modules 504-509 to process received radar return signals by applying signal conditioning (e.g., low noise amplification, low/high pass filtering, and analog-to-digital conversion) and signal analysis (e.g., gain, windowing, FFT, and filtering). The resulting digital output signals are then processed by the control processor(s) 501 detection and tracking to detect one or more targets. In particular, the control processor(s) may execute control code instructions for a CA-CFAR log detector algorithm which optimizes or corrects the results of a log-law detector with a log CA-CFAR correction factor so that the threshold for the optimal probability of false alarm can be computed with a log detector that reduces the dynamic range requirements from that of a square law detector while improving the probability of detection to be close to that of the much more computationally exhaustive traditional OS-CFAR approaches. In selected embodiments, the control code instructions for a CA-CFAR log detector algorithm may apply a log CA-CFAR correction factor to directly map the distribution of the log-detector to the distribution of the squared-law detector, such that the threshold for the optimal probability of false alarm can be computed. This may be implemented with control code instructions which are executed to process an input data stream to generate log detector sample values $\lambda=\log(z)$ for storage in a buffer window. In addition, the control code instructions may be executed to calculate a log CA-CFAR threshold by first computing, for each cell under test, an average sample value from the plurality of i=1-N nearest sample values $\lambda_i=\log(z_i)$, and then summing the average sample value with a computed probability of false alarm factor ($\alpha=\log(N[P_{FA}^{-1/N}-1])$ and a log CA-CFAR correction factor ($\beta=\frac{1}{2}\log(\pi)$). Under control of the control code instructions, a detector unit compares each cell under test with the corresponding CA-CFAR threshold to detect targets from any input data that exceeds the CA-CFAR threshold.

Figure 6:
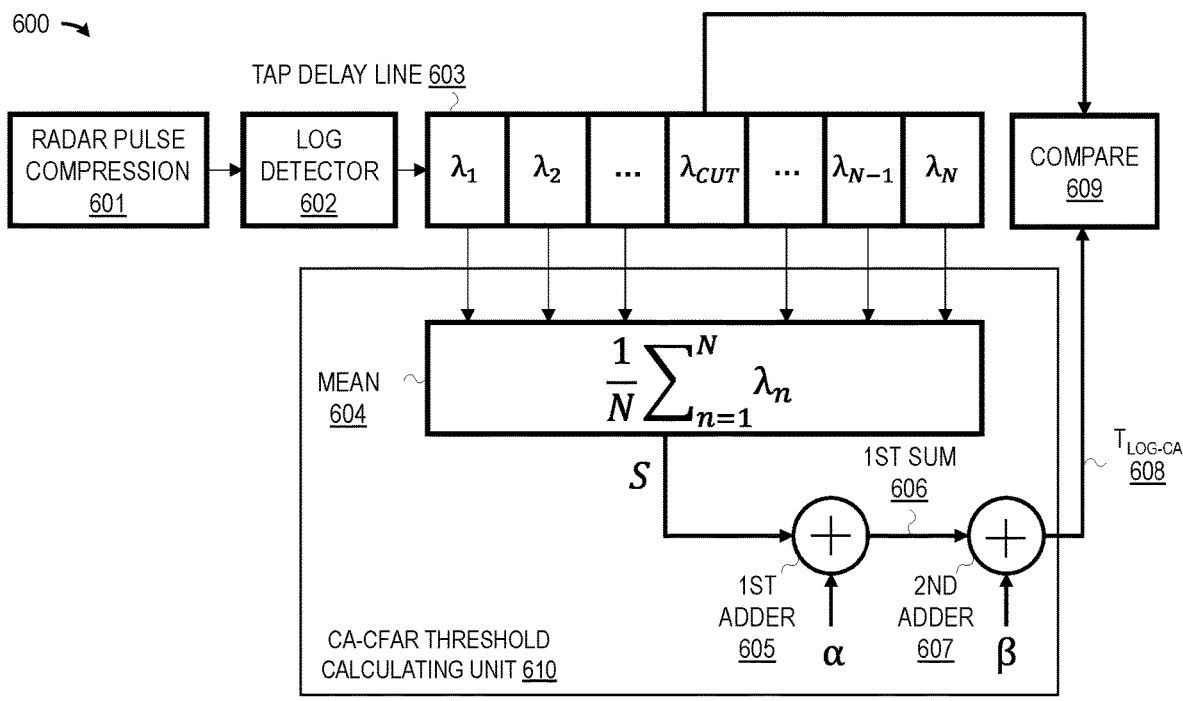
FIG. 6 is a simplified block diagram of a CA-CFAR log detector in accordance with selected embodiments of the present disclosure.

To provide additional details for an improved understanding of selected embodiments of the present disclosure, reference is now made to FIG. 6 which is a simplified block diagram of a CA-CFAR log detector 600 which may be implemented by a radar control processor(s) which is configured to optimize the results of a log-law detector with a log CA-CFAR correction factor β so that the threshold for the optimal probability of false alarm can be computed. As depicted, the CA-CFAR log detector 600 processes an input data stream with a radar pulse compressor 601 and log detector 602, thereby generating log detector sample values $\lambda=\log(z)$ for storage in a buffer window, such as a tap delay line 603. At a given point in time, the computed log detector sample values in the tap delay line 603 include a log detector sample value for the cell under test ($\lambda_{CUT}$) and the surrounding N nearest log detector sample values ($\lambda_1$-$\lambda_N$) on each side to the cell under test ($\lambda_{CUT}$).

To process the log detector sample values, the CA-CFAR log detector 600 may include a CA-CFAR threshold calculating unit 610 that calculates a CA-CFAR threshold by first computing, for each cell under test, an average sample value from the plurality of i=1-N nearest sample values $\lambda_i=\log(z_i)$. To this end, the CA-CFAR threshold calculating unit 610 may be configured with an averaging or mean computation unit 604 that is connected to the tap delay line 603 to receive the N nearest log detector sample values ($\lambda_1$-$\lambda_N$) around the log detector sample for the cell under test ($\lambda_{CUT}$), and to compute therefrom their average value $S=1/N\Sigma_{n=1}^{N}\lambda_n$. The CA-CFAR threshold calculating unit 610 may also include a first adder circuit 605 which is connected to receive the computed average value S and a probability of false alarm factor $\alpha=\log(N[P_{FA}^{-1/N}-1])$, and to generate therefrom a first sum value 606. The depicted CA-CFAR threshold calculating unit 610 also includes a second adder circuit 607 which is connected to receive the first sum value 606 and a log CA-CFAR correction factor $\beta=\frac{1}{2}\log(\pi)$, and to generate therefrom the log CA-CFAR threshold value $T_{LOG\_CA}$ 608. By virtue of adding the sum value $$S = \frac{1}{N}\sum_{n=1}^{N}\lambda_n,$$

the probability of false alarm factor α, and the log CA-CFAR correction factor $\beta=\frac{1}{2}\log(\pi)$, the resulting sum is the log CA-CFAR threshold value $T_{LOG\_CA}$ 608 defined in Equation (27). And if the log detector 602 has a base different than Euler's Constant e, all logarithms must be changed to that particular base by using Equation (28).

The CA-CFAR log detector 600 is connected and configured to evaluate the log detector sample value for the cell under test ($\lambda_{CUT}$) against the log CA-CFAR threshold $T_{LOG\_CA}$ 608 with a detector 609 which compares each cell under test with the corresponding log CA-CFAR threshold $T_{LOG\_CA}$ to detect targets from any input data that exceeds the log CA-CFAR threshold. This process is repeated for each log detector sample by configuring the n-sized window 603 to slide the computed log detector samples, sample by sample, through the entire input signal.

Figure 7:
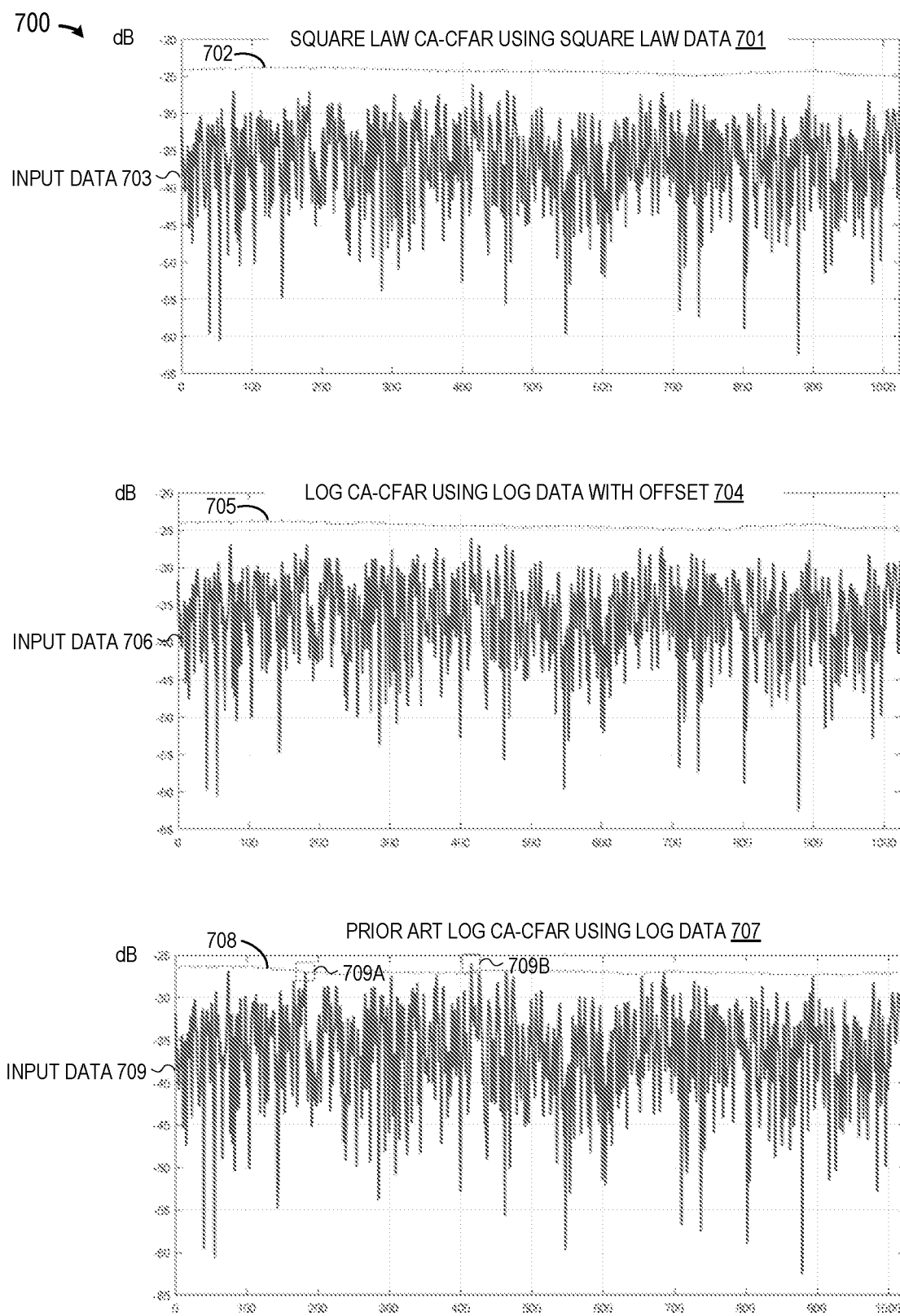
FIG. 7 depicts example range profiles for a CA-CFAR square law detector using square law data, a CA-CFAR log detector using log data, and a CA-CFAR log detector using corrected log data in accordance with selected embodiments of the present disclosure in a "noise only" use case when there are no targets.
Figure 8:
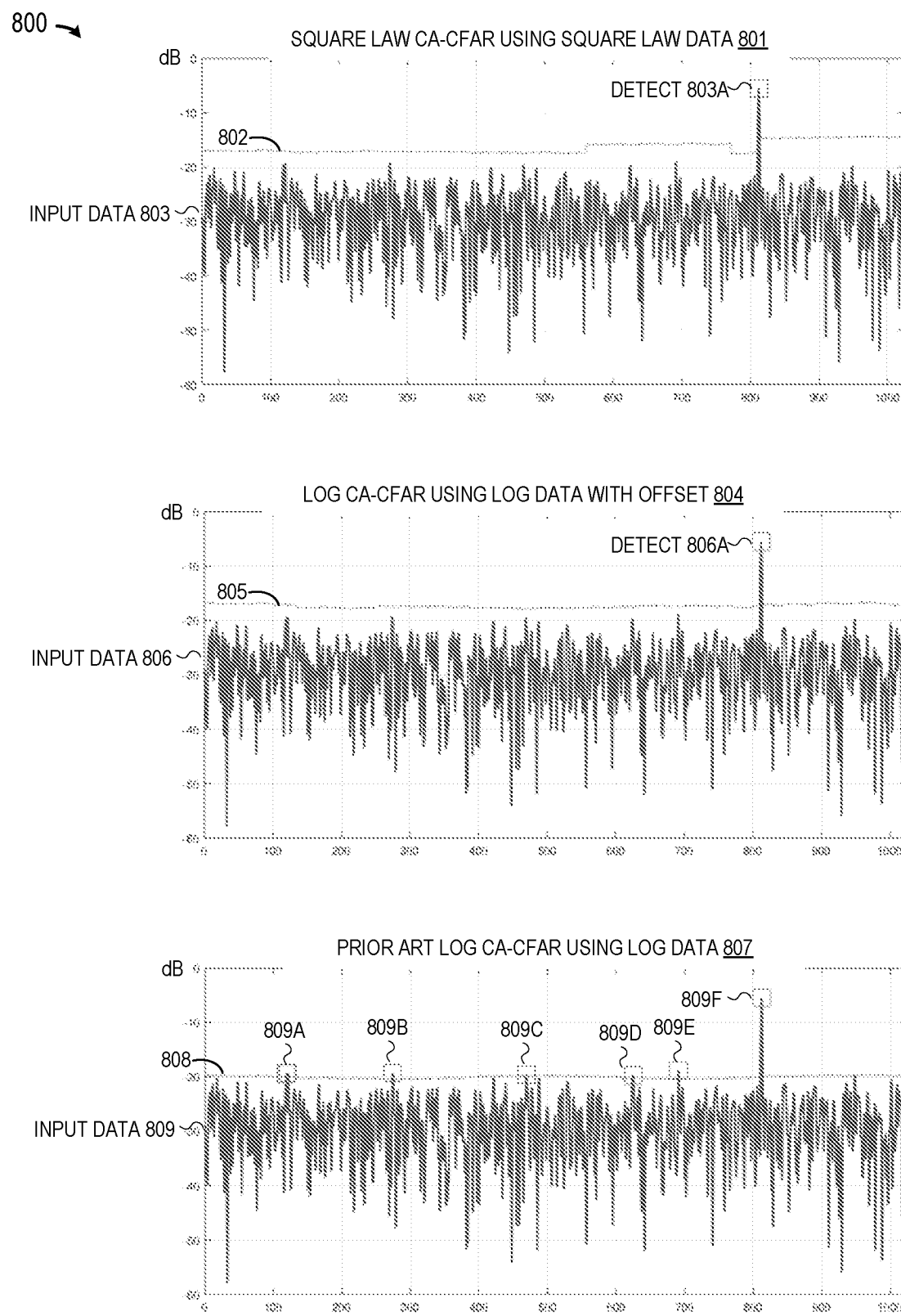
FIG. 8 depicts example range profiles for a CA-CFAR square law detector using square law data, a CA-CFAR log detector using log data, and a CA-CFAR log detector using corrected log data in accordance with selected embodiments of the present disclosure in a use case when there is one target.
Figure 9:
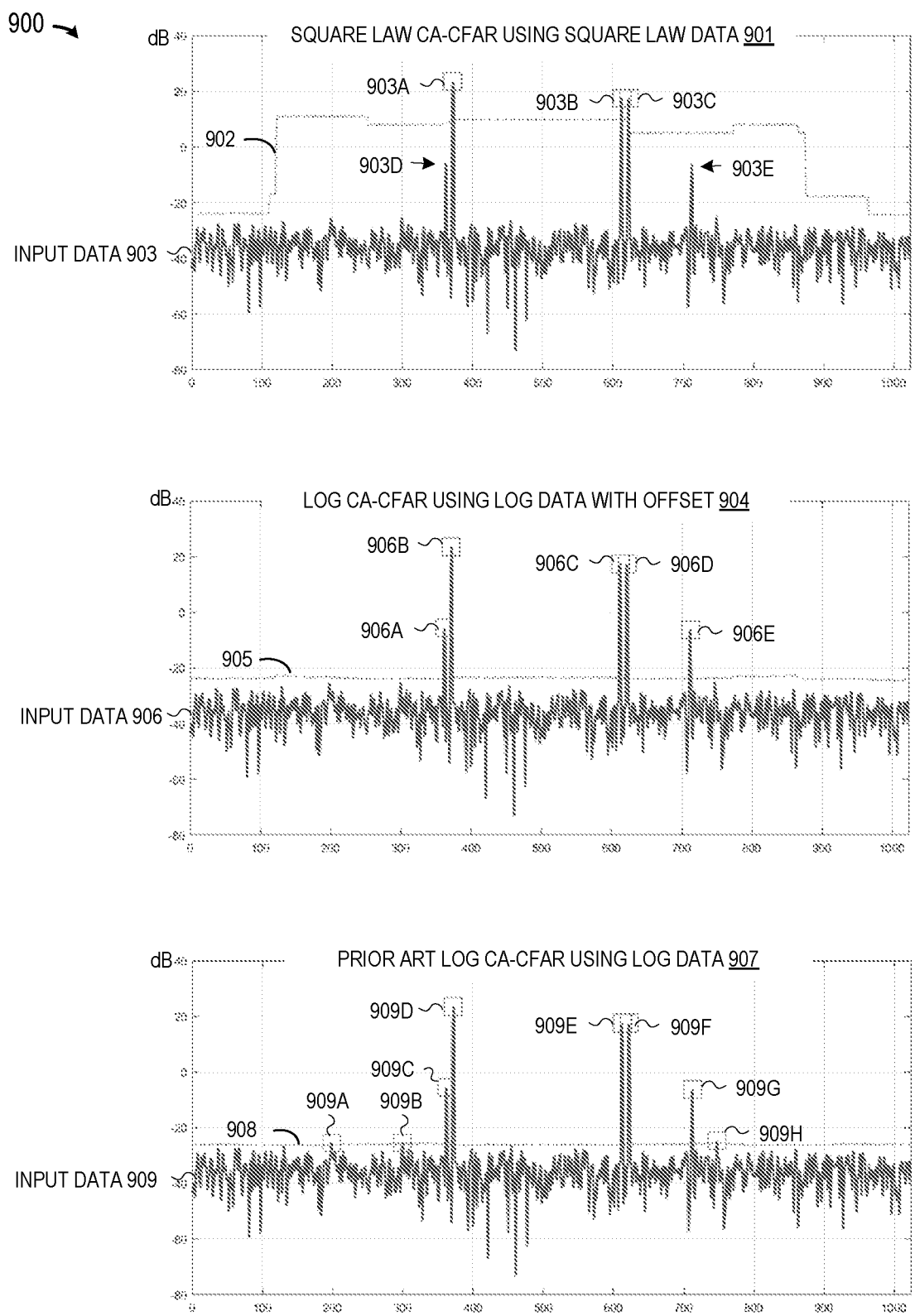
FIG. 9 depicts example range profiles for a CA-CFAR square law detector using square law data, a CA-CFAR log detector using log data, and a CA-CFAR log detector using corrected log data in accordance with selected embodiments of the present disclosure in a use case when there are multiple targets.

To provide additional details for an improved understanding of selected embodiments of the present disclosure, reference is now made to FIGS. 7-9 which show the results of a CA-CFAR square law detector, a CA-CFAR log detector with offset correction, and a CA-CFAR log detector without offset correction. In particular, FIG. 7 shows the comparative results for a scenario where there are no targets, FIG. 8 shows the comparative results for a scenario where there is 1 target, and FIG. 9 shows the comparative results for a scenario involving multiple, closely spaced targets.

Referring first to FIG. 7, there are depicted example range profiles 700 for comparing a CA-CFAR square law detector using square law data 701, a CA-CFAR log detector using corrected log data 704, and a CA-CFAR log detector using uncorrected log data 707 in a "noise only" use case when there are no targets. With the threshold 702 computed for the CA-CFAR square law detector using square law data 701, the input data 703 for the 0 target use case results in no target detections. In similar fashion, when the threshold 705 is computed for the corrected log CA-CFAR 704 (which uses log data that is corrected by the log CA-CFAR offset factor r), the input data 706 for the 0 target use case also results in no target detections. However, with the threshold 708 computed for the log CA-CFAR detector using uncorrected log data 707, the input data 709 for the 0 target use case results in two erroneous target detections 709A, 709B. In this 0 target case, it is clear that the corrected log CA-CFAR 704 matches the results of the square-law CA-CFAR detector 701.

Referring next to FIG. 8, there are depicted example range profiles 800 for comparing a CA-CFAR square law detector using square law data 801, a CA-CFAR log detector using corrected log data 804, and a CA-CFAR log detector using uncorrected log data 807 in a use case when there is only one target. With the threshold 802 computed for the CA-CFAR square law detector using square law data 801, the input data 803 for the single target use case results in a single target detection 803A. In similar fashion, when the threshold 805 computed for the corrected log CA-CFAR 804 (which uses log data that is corrected by the log CA-CFAR offset factor β), the input data 806 for the single target use case also results in one target detection 806A. However, with the threshold 808 computed for the log CA-CFAR detector using uncorrected log data 807, the input data 809 for the single target use case results in multiple erroneous target detections 809A-E along with the correct target detection 809F. In this single target case, it is clear that the corrected log CA-CFAR 804 matches the results of the square-law CA-CFAR detector 801.

Referring now to FIG. 9, there are depicted example range profiles 900 for comparing a CA-CFAR square law detector using square law data 901, a CA-CFAR log detector using corrected log data 904, and a CA-CFAR log detector using uncorrected log data 907 in a use case when there are multiple, closely spaced targets. With the threshold 902 computed for the CA-CFAR square law detector using square law data 901, the input data 903 for the multiple target use case results in the correct detection of multiple targets 903A-903C, but results in failure to detect targets 903D, 903E which are below the computed threshold 902. In the depicted computation of the threshold 902, the threshold is boosted by the square law data being adjusted or influenced by the high peaks of the closely spaced targets 903A-E. In contrast, when the threshold 905 computed for the corrected log CA-CFAR 904 (which uses log data that is corrected by the log CA-CFAR offset factor β), the input data 906 for the multiple target use case results in correct detection of multiple targets 906A-E. In addition, with the threshold 908 computed for the log CA-CFAR detector using uncorrected log data 907, the input data 909 for the multiple target use case results in multiple erroneous target detections 909A-B, 909h along with the correct target detections 909C-G. In this multiple target case, it is clear that the corrected CA-CFAR log detector 904 performs better than the square-law CA-CFAR detector 901 since the logarithmic transformation used in the corrected CA-CFAR log detector 904 to compute the threshold 905 is less affected by high peaks, thereby allowing the corrected CA-CFAR log detector 904 to greatly improve the probability of detection, while having no impact on the probability of false alarm or numerical complexity.

Figure 10:
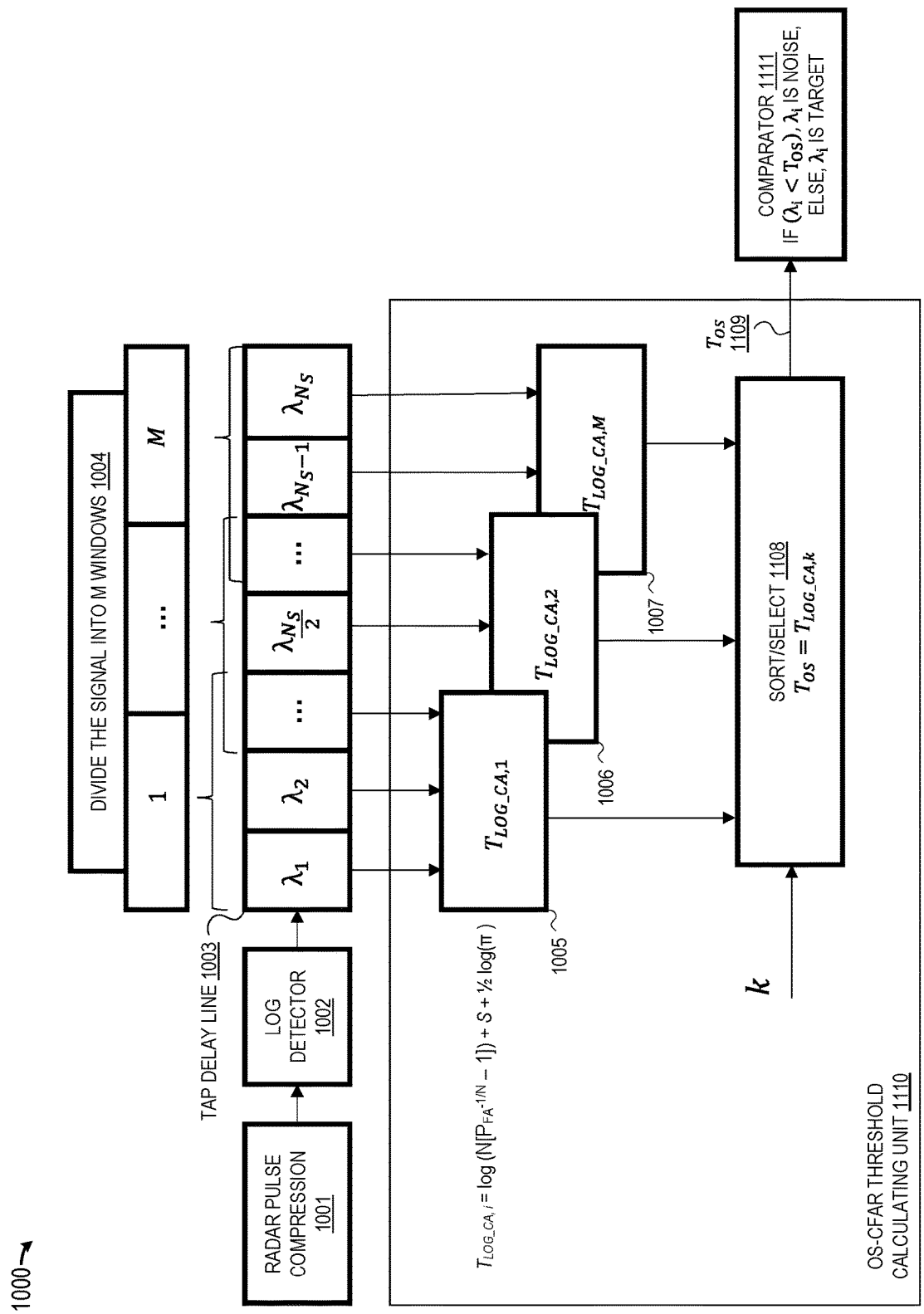
FIG. 10 is a simplified block diagram of an OS-CA-CFAR log detector in accordance with selected embodiments of the present disclosure.

To provide additional details for an improved understanding of selected embodiments of the present disclosure, reference is now made to FIG. 10 which is a simplified block diagram of the proposed OS-CA-CFAR log detector 1000 which may be implemented by a radar control processor(s) that is configured to compute a traditional OS-CFAR threshold with low computational costs by grouping or dividing the log detector samples into multiple log detector sample subsets for use in computing multiple log CA-CFAR thresholds which are then sorted to select the kth largest log CA-CFAR threshold value as the OS-CA-CFAR threshold $T_{OS}$. As depicted, the OS-CA-CFAR log detector 1000 processes an input data stream with a radar pulse compressor 1001 and log detector 1002, thereby generating log detector sample values $\lambda = \log(|x|^2)$ for storage in a buffer window or tap delay line 1003. In particular, there are $N_S$ log detector sample values stored in the tap delay line 1003, where $N_S$ is the size of the entire input data signal, and is not to be confused with N which is the length of the CA-CFAR window shown in FIG. 6.

To process the log detector sample values $(\lambda_1 - \lambda_{Ns})$, the OS-CA-CFAR log detector 1000 may group the log detector samples into separate sample subsets and then compute, from the sample values in each sample subset, an average sample value. In selected embodiments, the $N_S$ log detector samples may be divided into relatively small windows or blocks of size K, $block_{i=1:N/K} = \lambda_{(i-1)K:iK-1}$. As disclosed herein, the groupings of the log detector samples can be overlapping samples or non-overlapping samples. Alternatively, the sample grouping can be chosen randomly. For example, with M windows, the first window takes N samples out of the total of Ns (1 9 320 122 . . . ), the second window takes N samples (2, 32, . . . ), and so on.

However the log detector samples are grouped into M windows or sample subsets, the OS-CA-CFAR log detector 1000 then computes the threshold for each block, $T_{LOG\_CA}$ by using Equation (27). To this end, the OS-CA-CFAR log detector 1000 includes an OS-CFAR threshold calculating unit 1110 having a plurality of M CA-CFAR threshold calculating units 1005-1007, each of which is connected to receive a log detector sample value subset of N samples from the tap delay line 1003 and to compute a local threshold $T_{LOG\_CA_i} = \log(N[P_{FA}^{-1/N} - 1]) + S + \frac{1}{2} \log(\pi)$. For example, a first CA-CFAR threshold calculating unit 1005 may be connected to receive a first log detector sample value subset (e.g., $\lambda_1, \lambda_2, \ldots$). Based on the first log detector sample value subset, the first CA-CFAR threshold calculating unit 1005 computes a first log CA-CFAR threshold $T_{LOG\_CA,1}$ as the sum of a computed average value $$S = \frac{1}{N}\sum_{n=1}^{N}\lambda_n,$$

a computed probability of false alarm factor α=log(N[$P_{FA}^{-1/N}$−1]), and a log CA-CFAR correction factor β=½ log(π). In similar fashion, a second CA-CFAR threshold calculating unit 1006 is connected to receive a second log detector sample value subset (e.g., $\lambda_{(Ns/2-1)}, \lambda_{(Ns/2)}, \lambda_{(Ns/2+1)}$) and to compute therefrom a second log CA-CFAR threshold $T_{LOG\_CA,2}$ as the sum of a computed average value $$S = \frac{1}{N}\sum_{n=1}^{N}\lambda_n,$$

a computed probability of false alarm factor α=log(N[$P_{FA}^{-1/N}$−1]), and a log CA-CFAR correction factor β=½ log(π). Finally, the Mth CA-CFAR threshold calculating unit 1007 is connected to receive the Mth log detector sample value subset (e.g., $\lambda_{(Ns-2)}, \lambda_{(Ns-1)}, \lambda_{Ns}$), and to compute therefrom a Mth log CA-CFAR threshold $T_{LOG\_CA,M}$ as the sum of a computed average value $$S = \frac{1}{N}\sum_{n=1}^{N}\lambda_n,$$

a computed probability of false alarm factor α=log(N[$P_{FA}^{-1/N}$−1]), and a log CA-CFAR correction factor β=½ log(π). By using a log detector to compute the local thresholds $T_{LOG\_CA,i}$, the presence of multiple targets will have a negligible influence on the computation of the local CA-CFAR values. Conversely, if a square-law detector were used, the threshold would be a random variable, depending if there are targets present in the window under test.

The final step is to compute the OS-CA-CFAR threshold by sorting the local thresholds $T_{LOG\_CA,1}$-$T_{LOG\_CA,M}$ to select the kth local threshold as the OS-CA-CFAR threshold. To this end, the OS-CA-CFAR threshold calculating unit 1110 may include a sorting/selection unit 1108 for sorting and selecting the kth largest CA-CFAR threshold that is provided as the OS-CA-CFAR threshold $T_{OS}$ 1109. In response to the sorting statistic k, the sorting and selection unit 1108 is configured to compute the OS-CA-CFAR threshold $T_{OS}$ 1109 using the thresholds $T_{LOG\_CA,i=1:N/K}$. In an example embodiment, the sorting and selection unit 1108 uses the N/2'th statistic as the optimal threshold so that, after the local thresholds $T_{LOG\_CA,1}$-$T_{LOG\_CA,M}$ have been sorted in an ascending order, the value of the N/2 sample is chosen as the ultimate OS-CFAR threshold $T_{OS}$ 1109, and plays the role of a median conformable to the Central Limit Theorem. However, for special radar applications where there is a large density of targets, this value can be lowered.

The OS-CA-CFAR log detector 1000 is connected and configured to evaluate each of the log detector sample values $\lambda_1$-$\lambda_{Ns}$ against the OS-CA-CFAR threshold $T_{OS}$ 1109 with a detector 1111 which compares each log detector sample value $\lambda_i$ with the computed OS-CA-CFAR threshold $T_{OS}$ to detect targets from any input data that exceeds the OS-CA-CFAR threshold. If the log detector sample value $\lambda_i < T_{OS}$, the log detector sample value $\lambda_i$ is noise. However, if the log detector sample value $\lambda_i \geq T_{OS}$, then log detector sample value $\lambda_i$ is a detected target.

Figure 11:
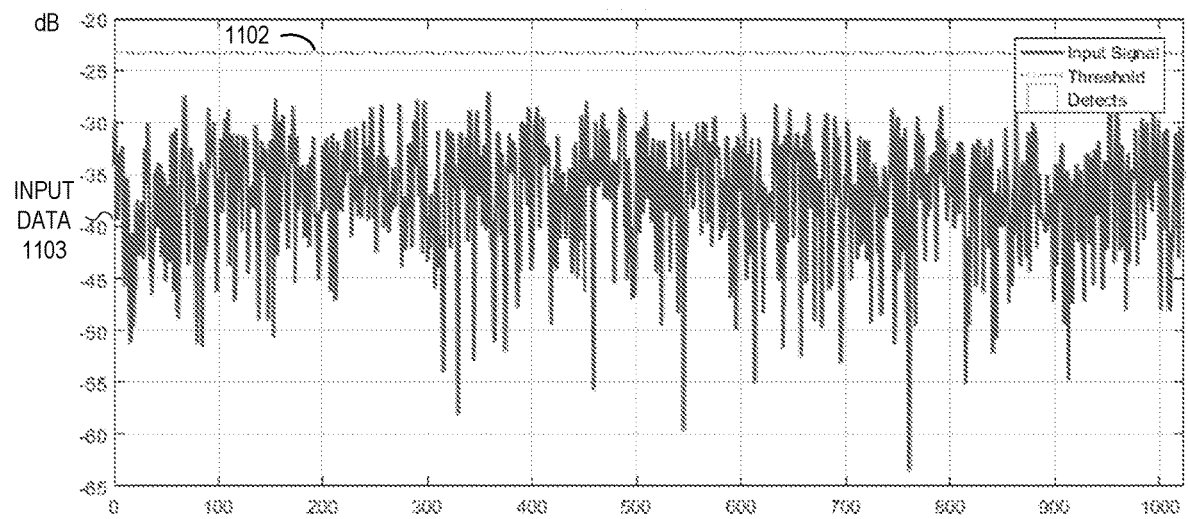
FIG. 11 depicts example range profiles for a conventional OS-CFAR detector and a log-based OS-CA-CFAR log detector in accordance with selected embodiments of the present disclosure in a "noise only" use case when there are no targets.
Figure 11:
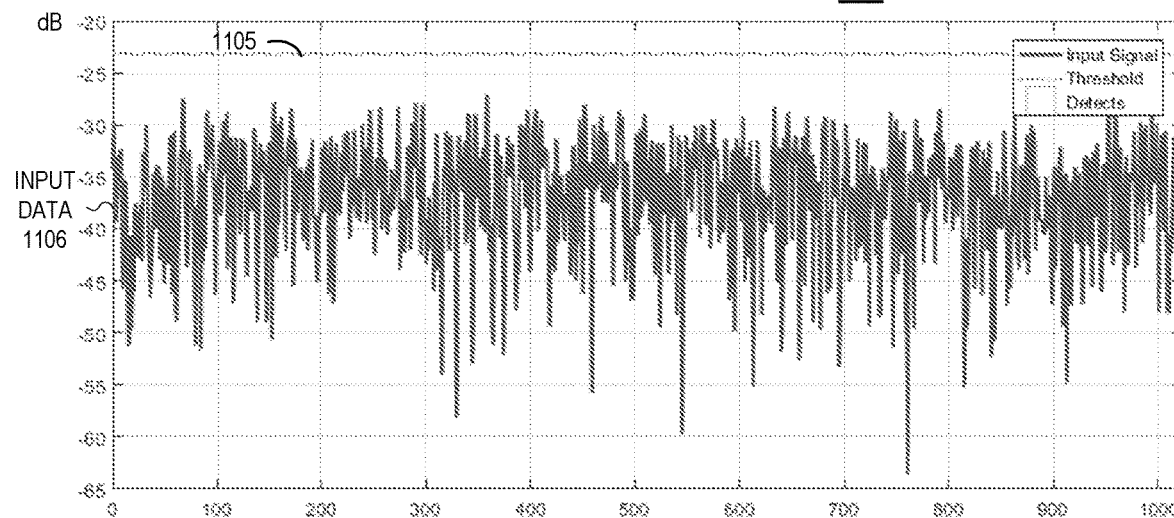
Figure 12:
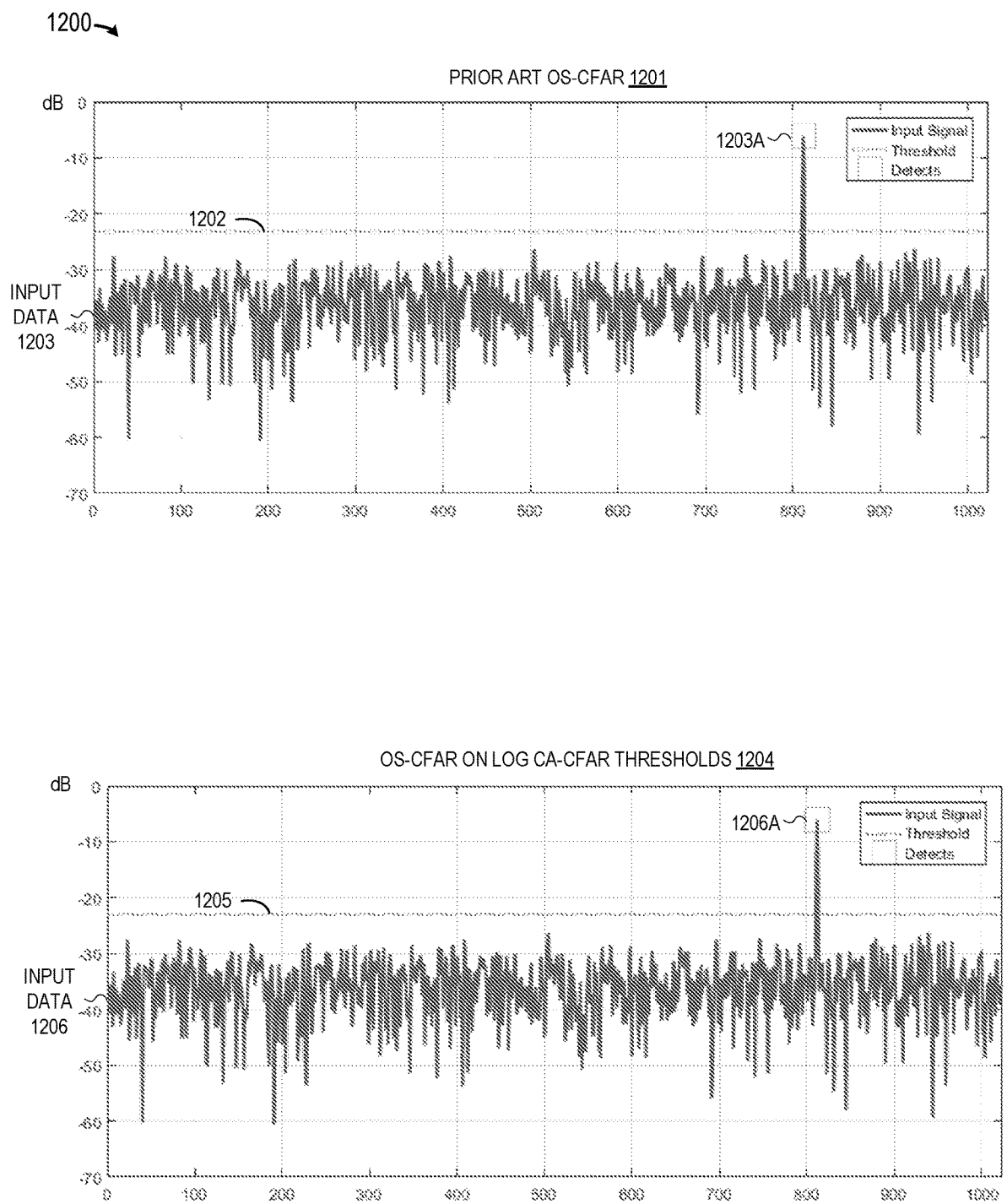
FIG. 12 depicts example range profiles for a conventional OS-CFAR detector and a log-based OS-CA-CFAR log detector in accordance with selected embodiments of the present disclosure in a use case when there is one target.
Figure 13:
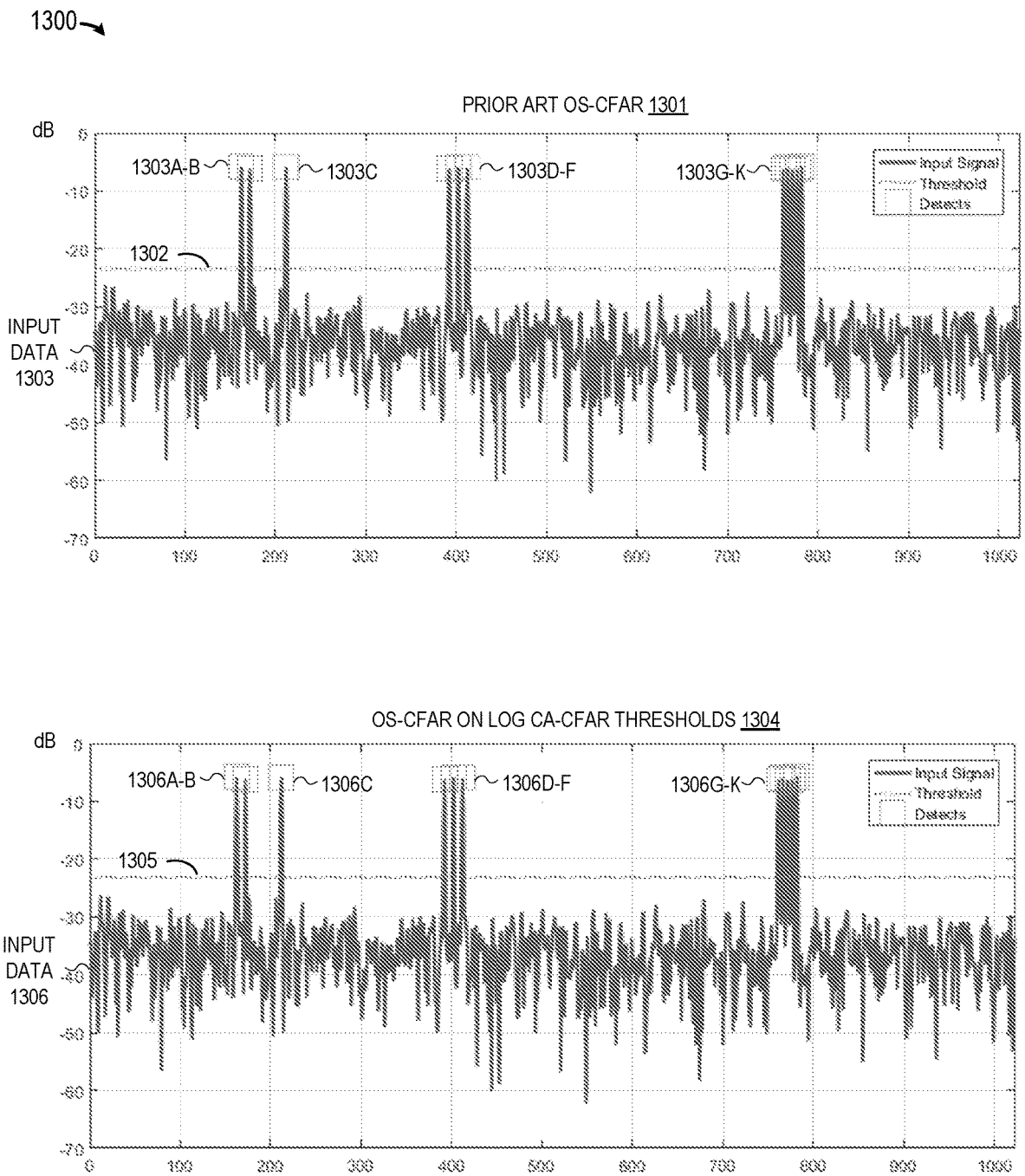
FIG. 13 depicts example range profiles for a conventional OS-CFAR detector and a log-based OS-CA-CFAR log detector in accordance with selected embodiments of the present disclosure in a use case when there are multiple targets.

To provide additional details for an improved understanding of selected embodiments of the present disclosure, reference is now made to FIGS. 11-13 which show the results of a conventional OS-CFAR detector and an OS-CA-CFAR log detector which computes an OS-CFAR threshold by selecting between sorted CA-CFAR thresholds computed with offset correction. In particular, FIG. 11 shows the comparative results for a scenario where there are no targets, FIG. 12 shows the comparative results for a scenario where there is 1 target, and FIG. 13 shows the comparative results for a scenario involving multiple, closely spaced targets.

Referring first to FIG. 11, there are depicted example range profiles 1100 for comparing a conventional OS-CFAR detector 1101 and an OS-CA-CFAR log detector 1104 which computes an OS-CFAR threshold by selecting between sorted CA-CFAR thresholds computed with offset correction in a "noise only" use case when there are no targets. With the threshold 1102 computed for the conventional OS-CFAR detector 1101, the input data 1103 for the 0 target use case results in no target detections. In similar fashion, when the OS-CA-CFAR threshold 1105 is computed with the OS-CFAR detector 1104 which selects between sorted CA-CFAR thresholds (which uses log data that is corrected by the log CA-CFAR offset factor β), the input data 1106 for the 0 target use case also results in no target detections.

Referring next to FIG. 12, there are depicted example range profiles 1200 for comparing a conventional OS-CFAR detector 1201 and an OS-CA-CFAR log detector 1204 which computes an OS-CFAR threshold by selecting between sorted CA-CFAR thresholds computed with offset correction in a use case when there is only one target. With the threshold 1202 computed for the conventional OS-CFAR detector 1201, the input data 1203 for the single target use case results in a single target detection 1203A. In similar fashion, when the threshold 1205 is computed for the OS-CA-CFAR log detector 1104 (which selects between sorted CA-CFAR thresholds computed with offset factor r), the input data 1206 for the single target use case also results in one target detection 1206A. In this single target case, it is clear that the OS-CA-CFAR log detector 1204 which uses corrected log CA-CFAR thresholds matches the results of the conventional OS-CFAR detector 1201.

Referring now to FIG. 13, there are depicted example range profiles 1300 for comparing a conventional OS-CFAR detector 1301 and an OS-CA-CFAR log detector 1304 which computes an OS-CFAR threshold by selecting between sorted CA-CFAR thresholds computed with offset correction in a use case when there are multiple, closely spaced targets. With the threshold 1302 computed for the conventional OS-CFAR detector 1301, the input data 1303 for the multiple target use case results in the correct detection of multiple targets 1303A-K without any detection failures. In similar fashion, when the threshold 1305 is computed for the OS-CA-CFAR log detector 1104 (which selects between sorted CA-CFAR thresholds computed with offset factor β), the input data 1306 for the multiple target use case results in correct detection of multiple targets 1306A-K, again without any detection failures. In this multiple target case, it is clear that the OS-CA-CFAR log detector 1304 matches the detection performance of the conventional OS-CFAR detector 1301 while greatly improving computational speed.

The probability of false alarm has been computed on a sample set of 100000 Monte-Carlo simulations, where only noise is present. For a pre-established false alarm probability of 0.0001, the proposed log OS-CA-CFAR triggered false peaks with a probability of 0.0043, while the present invention only had 0.0029. The number of samples used was 1024.

Figure 14:
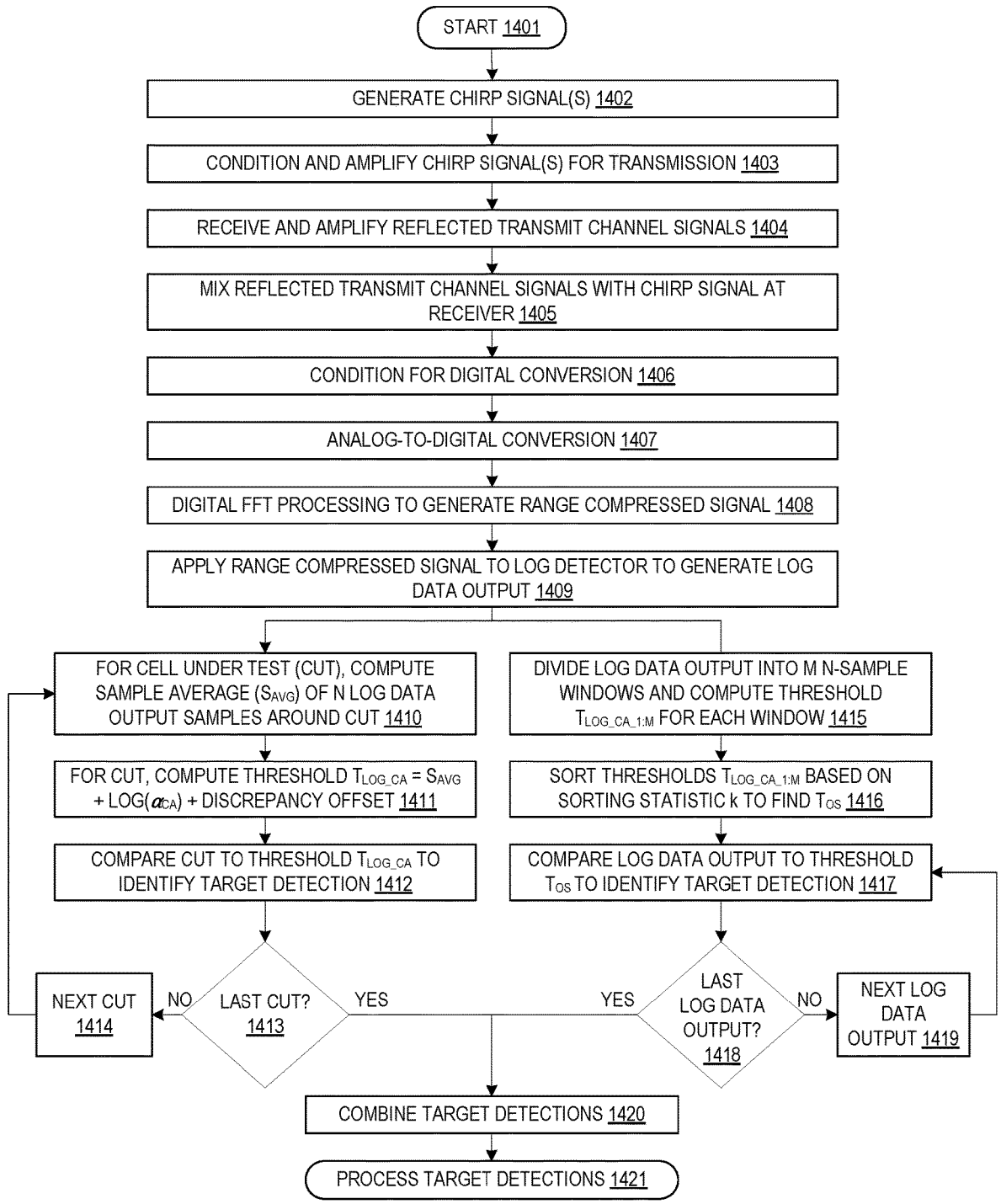
FIG. 14 illustrates a simplified flow chart showing the logic for using a cell-average CFAR algorithm or ordered-statistic of cell-average CFAR algorithm for log detectors in accordance with selected embodiments of the present disclosure.

To provide additional details for an improved understanding of selected embodiments of the present disclosure, reference is now made to FIG. 14 which illustrates a simplified flow chart 1400 showing the logic for using a cell-average CFAR algorithm or ordered-statistic of cell-average CFAR algorithm for log detectors. In an example embodiment, the control logic and methodology shown in FIG. 14 may be implemented as hardware and/or software on a radar controller processor which includes a processor or microcontroller unit for implementing an CA-CFAR detector and/or an OS-CA-CFAR detector. Operating under control programming control code, the radar controller processor is configured to execute the cell average-constant false alarm rate log detector algorithm for directly mapping the distribution of the log-detector to the distribution of the squared-law detector by applying log CA-CFAR correction factor so that the threshold for the optimal probability of false alarm can be computed with a log detector that reduces the dynamic range requirements from that of a square law detector while improving the probability of detection to be close to that of the much more computationally exhaustive traditional OS-CFAR approaches.

The process starts (step 1401), such as when the radar system begins the process of sensing the location and movement of one or more target objects using one or more transmit radar signals that are sent over a plurality of transmit antennas. To generate the transmit radar signals, the radar system first generates a reference chirp signal (step 1402), such as by periodically modulating a transmit radar signal with a frequency and/or phase shift. For example, with automotive Frequency Modulation Continuous Wave (FMCW) radars, the reference chirp signal may be generated as a Linear Frequency Modulation (LFM) waveform that is distributed to a plurality of transmit channel circuits which are respectively associated with a plurality of transmit antennas.

At step 1403, the chirp signals are conditioned and amplified for transmission over the corresponding transmit channel circuits. In selected embodiments, this processing is performed by the transmit channel circuits which each include an RF conditioning module (which filters the chirp signal) and power amplifier (which amplifies the RF conditioning module output for transmission over a corresponding transmit antenna). In embodiments where time-domain modulation is used in combination with the frequency/phase offset modulation, the non-adjacent transmit channel circuits may be controlled to sequentially condition and amplify transmit radar waveforms from non-adjacent transmit antennas.

At step 1404, the reflected reference chirp signals from the different transmit channels are received and amplified at the receiver. In selected embodiments, one or more receive antennas at the receiver module receive target returns from the transmitted reference chirp signal waveforms as (radio frequency) antenna signals for subsequent amplification, such as by using a low noise amplifier to generate an amplified RF signal from the target returns.

At step 1405, the amplified transmit channel signals are mixed with the reference chirp signal at the receiver to generate an intermediate frequency (IF) signal. In selected embodiments, the mixing step may be implemented by applying the reference chirp signal to a receiver module mixer which is also connected to receive the amplified transmit channel signals for mixing with the reference chirp signal, thereby generating an intermediate frequency signal.

At step 1406, the intermediate frequency signal is conditioned for digital conversion. In selected embodiments, the conditioning process includes feeding the intermediate frequency signal to a high-pass filter, amplifying the filtered signal with a variable gain amplifier before being fed to a low-pass filter, thereby generating a re-filtered signal.

At step 1407, the re-filtered conditioned IF signal is fed to a high-speed analog/digital converter (ADC) which has a digital signal output that is suitable for digital processing. Because the maximum unambiguous range extent for each frequency offset reference chirp signal is inversely related to the fast-time sampling interval, the ADC has a high sampling rate. For example, if a conventional TD-MIMO FCM radar uses a 40 mega-samples-per-second (Msps) ADC in the receiver module, the ADC sampling rate is increased to N×40 Msps to enable the N-transmitters MIMO operation using the disclosed FOM approach. Note also that depending on the radar system requirements and also upon the actual performance of the low-pass filter that directly precedes the ADC, the sample rate of the ADC may need to be increased beyond N×40 Msps.

At step 1408, the digital processing is applied to separate the reflected transmit channel signals in the fast-time FFT or range domain, along with other radar signal processing steps. While any suitable radar signal processing steps may be used, each radar may be configured to perform fast-time FFT and slow-time FFT processing on the received radar signal to derive range and Doppler information. In the fast-time FFT processing, the frequency offset modulation of the reference chirp signals sent over the N transmission channels enables the spectrum to be divided into N consecutive segments with each being associated with a corresponding transmitter. Because the transmitters are separated or divided in the range domain and the waveform is based on LFM, the approach can also be referred to as the LFM range-division (RD) MIMO approach. Based on the range-spectrum division arrangement, the fast-time samples associated with distinct transmitters are then recovered (and whose sum and delta components are coherently summed for the case of I-channel only FOM) and the subsequent MIMO virtual array processing can be carried out.

At step 1409, the range compressed signal is applied to the log detector to generate a sequence of log detector data output sample values $\lambda$ for storage in a buffer window or tap delay line. In selected embodiments, the log detector data output sample values generated at step 1409 include a log detector sample value for the cell under test ($\lambda_{CUT}$) and the surrounding N nearest log detector sample values ($\lambda_1$-$\lambda_N$) on each side to the cell under test ($\lambda_{CUT}$). In other embodiments, the log detector data output sample values generated at step 1409 include $N_S$ log detector sample values for the entire input data signal.

In a first example embodiment, a CA-CFAR algorithm is applied to the log detector data output sample values $\lambda_1$-$\lambda_N$ at steps 1410-1414 to calculate a CA-CFAR threshold value $T_{LOG\_CA}$ for each log detector sample value. Starting at step 1410, an average sample value ($S_{AVG}$) is computed for each cell under test from N log data output samples. For example, the average may be computed, for a first cell under test ($\lambda_{CUT}$), by computing $$S_{AVG} = \frac{1}{N}\sum_{n=1}^{N} \lambda_n$$

as the mean or average of the plurality of i=1-N nearest log detector sample values $\lambda_i$=log($z_i$). Continuing with step 1411, a log CA-CFAR threshold value $T_{LOG\_CA}$ is computed for the cell under test by adding the average sample value ($S_{AVG}$) with a first probability of false alarm factor $\alpha=\log(N[P_{FA}^{-1/N}-1])$ and a log CA-CFAR correction factor $\beta=\frac{1}{2}\log(\pi)$. At step 1412, the log detector sample value for the cell under test ($\lambda_{CUT}$) is compared to the CA-CFAR threshold value $T_{LOG\_CA}$ for purposes of identifying target detections when $\lambda_{CUT} > T_{LOG\_CA}$. At step 1413, it is determined if all log detector sample values have been evaluated as a cell under test, such as by detecting if the last cell under test has been reached. If not (negative outcome to detection step 1413), then the next cell under test is selected (step 1414) and the processing of steps 1410-1412 is iteratively repeated. However, when the last cell under test is processed (affirmative outcome to detection step 1413), then the processing proceeds to combine the target detection (step 1420).

In a second example embodiment, an OS-CA-CFAR algorithm is applied to the log detector data output sample values $\lambda_1$-$\lambda_{N_S}$ at steps 1415-1419 to calculate an OS-CFAR threshold value $T_{OS}$ that is applied to all of the $N_S$ log detector sample values. Starting at step 1415, the $N_S$ log detector sample values are divided into M N-sample windows or sample subsets which are each used to compute a CA-CFAR threshold value $T_{LOG\_CA\_i}$ for i=1-M. As will be appreciated, the assignment or grouping of log detector sample values into windows may be overlapping, non-overlapping, or randomly selected log detector sample values. As disclosed herein, each CA-CFAR threshold value $T_{LOG\_CA\_i}$ may be computed by adding an average sample value $$\left( S_{AVG} = \frac{1}{N} \sum_{n=1}^{N} \lambda_n \right)$$

for each sample subset from N log data output samples with a first probability of false alarm factor $\alpha=\log(N[P_{FA}^{-1/N}-1])$ and a log CA-CFAR correction factor $\beta=\frac{1}{2}\log(\pi)$. At step 1416, the CA-CFAR threshold values $T_{LOG\_CA\_i}$ may be sorted based on a sorting statistic k to select the kth largest CA-CFAR threshold value $T_{LOG\_CA\_i}$ as the OS-CFAR threshold value $T_{OS}$. At step 1417, each of the log detector sample values $\lambda_1$-$\lambda_{N_S}$ is compared to the OS-CFAR threshold value $T_{OS}$ for purposes of identifying target detections when $\lambda > T_{OS}$. At step 1418, it is determined if all log detector data output sample values have been evaluated as a cell under test, such as by detecting if the last log detector data output sample value has been reached. If not (negative outcome to detection step 1418), then the next log detector data output sample value is selected (step 1419) and the processing of step 1417 is iteratively repeated. However, when the last log detector data output sample value is processed (affirmative outcome to detection step 1418), then the processing proceeds to combine the target detection (step 1420).

At step 1420, the target detections identified by the CA-CFAR algorithm processing steps 1410-1414 and/or OS-CA-CFAR algorithm processing steps 1415-1419 are combined to obtain the range-Doppler peak detections which are then further processed at step 1421 using any suitable processing steps, such as constructing MIMO virtual arrays, constructing beamforming outputs, and computing a target map from the beamforming outputs to identify the range, Doppler, and angle values for one or more detected targets identified by the target returns.

As disclosed herein, a vehicle radar system, apparatus and method use a radar control processing unit to generate compressed radar data signals, to apply the compressed radar data signals to a log detector to generate log detector sample values, and to generate a first log cell-average constant false alarm rate (CA-CFAR) threshold from the log detector sample values by computing and adding an average sample value $S_{AVG}$ from the log detector sample values, a probability of false alarm factor $\alpha$, and a log CA-CFAR correction factor $\beta$, where the threshold is used to distinguish target samples from noise samples. Alternatively, for signals perturbated by white noise, the log sample values may be processed in a slightly different manner, by first dividing the log samples into groups and computing the CA-CFAR threshold value of each individual group as previously described, followed by applying an OS-CFAR algorithm on the CA-CFAR thresholds. For two-dimensional signals, such as Range-Doppler Matrices or Synthetic Aperture Radar Images, the two detection methods may be combined to obtain better detection probabilities by generating the log 2D data and then applying the first detection method on the first dimension, and the second detection method on the second dimension, and then applying Boolean AND or OR to decide for each sample if a target is present or not. In selected embodiments, the log CA-CFAR threshold computation algorithm may be used independently from the OS-CA-CFAR threshold computation algorithm. Alternatively, they may be used together for multidimensional radar signals (e.g. images), as in one is applied on rows, and the other on columns, to improve detection performance.

By now it should be appreciated that there has been provided a radar system, device, and method for computing a cell-average constant false alarm rate (CA-CFAR) threshold with a radar control processing unit. The disclosed radar system includes a radio-frequency (RF) transmitter unit and first plurality of transmit antennas which are controlled by the radar control processing unit to transmit MIMO radar signals. The disclosed radar system also includes an RF receiver unit and a first plurality of receive antennas which are controlled by the radar control processing unit generate digital output signals from MIMO radar signal returns received in response to the MIMO radar signals. The disclosed radar control processing unit is configured to process the digital output signals to generate compressed radar data signals and to apply the compressed radar data signals to a log detector to generate a first plurality of log detector sample values comprising a cell under test sample value $\lambda_{CUT}$ and a plurality of N surrounding sample values $\lambda i$. In addition, the disclosed radar control processing unit is configured to generate a first log cell-average constant false alarm rate (CA-CFAR) threshold based on the first plurality of log detector sample values by computing a log CA-CFAR correction factor $\beta$ to adjust a sample average of the log detector. For example, the first log CA-CFAR threshold may be generated by computing and adding an average sample value $S_{AVG}$ from the first plurality of log detector sample values, a probability of false alarm factor $\alpha$, and a log CA-CFAR correction factor $\beta$. In addition, the radar control processing unit may be configured to compute the probability of false alarm factor from a specified probability of false alarm, $P_{FA}$ by computing $\alpha=\log(N[P_{FA}^{-1/N}-1])$. In other selected embodiments, the radar control processing unit is configured to compute the log CA-CFAR correction factor $\beta=\frac{1}{2}\log(\pi)$. In selected embodiments, the radar control processing unit is further configured to compare the cell under test sample value $\lambda_{CUT}$ to the first log CA-CFAR threshold to detect a target when the cell under test sample value $\lambda_{CUT}$ exceeds the log CA-CFAR threshold. In selected embodiments, the radar control processing unit may also be configured to generate an ordered statistics cell-average constant false alarm rate (OS-CA-CFAR) threshold for the compressed radar data signals. To compute the OS-CA-CFAR threshold, the radar control processing unit generates a second plurality of log detector sample values when the compressed radar data signals are applied to the log detector. In selected embodiments, the second plurality of log detector sample values are generated by applying the compressed radar data signals to the log detector to generate a plurality of log detector sample values, and then grouping the plurality of log detector sample values into the first and second plurality of log detector sample values. As disclosed, the log detector sample values may be grouped into the first and second plurality of log detector sample values by assigning overlapping log detector sample values from the plurality of log detector sample values into the first and second plurality of log detector sample values; assigning non-overlapping log detector sample values from the plurality of log detector sample values into the first and second plurality of log detector sample values; or randomly assigning log detector sample values from the plurality of log detector sample values into the first and second plurality of log detector sample values. In computing the OS-CA-CFAR threshold, the radar control processing unit computes a second average sample value $S_{AVG}$ from the second plurality of log detector sample values, and then adds the second average sample value $S_{AVG}$, probability of false alarm factor $\alpha$, and log CA-CFAR correction factor $\beta$ to compute the second log CA-CA-CFAR threshold. In addition, the radar control processing unit sorts the first and second log CA-CFAR thresholds by magnitude to form a sorted list of log CA-CFAR thresholds, and then computes the OS-CA-CFAR threshold by selecting a kth threshold from the sorted list of log CA-CFAR thresholds. In such embodiments, the radar control processing unit may also be configured to compare each sample value in the first and second plurality of log detector sample values to the OS/CA-CFAR threshold to detect a target when any sample value in the first and second plurality of log detector sample values exceeds the OS/CA-CFAR threshold.

In another form, there is provided a method for operating a radar system and device wherein a cell-average constant false alarm rate (CA-CFAR) threshold is computed and used to detect targets. In the disclosed methodology, MIMO radar signals are transmitted from transit antennas in a plurality of transmit and receive antennas, and MIMO radar signal returns are received at receive antennas in the plurality of transmit and receive antennas. In addition, the MIMO radar signal returns are processed to generate compressed radar data signals that are applied to a log detector to generate a first plurality of log detector sample values. The disclosed methodology also generates a first log cell-average constant false alarm rate (CA-CFAR) threshold from the first plurality of log detector sample values by computing a log CA-CFAR correction factor $\beta$ to adjust a sample average of the log detector. For example, the first log CA-CFAR threshold by computing an average sample value $S_{AVG}$ from the first plurality of log detector sample values, computing a probability of false alarm factor $\alpha$, computing a log CA-CFAR correction factor $\beta$, and adding the average sample value $S_{AVG}$, probability of false alarm factor $\alpha$, and log CA-CFAR correction factor $\beta$ to compute the first log CA-CFAR threshold. In selected embodiments, the average sample value $S_{AVG}$ is computed by retrieving a plurality of N sample values $\lambda_i$ from the first plurality of log detector sample values which surround a cell under test sample value $\lambda_{CUT}$ in the first plurality of log detector sample values, and then computing the average sample value $$S_{AVG} = \frac{1}{N}\sum_{i=1}^{N}\lambda_i.$$

In other embodiments, the probability of false alarm factor $\alpha$ is computed by retrieving a specified probability of false alarm, $P_{FA}$, and then computing $\alpha=\log(N[P_{FA}^{-1/N}-1])$. In other embodiments, the log CA-CFAR correction factor $\beta$ is computed as $\beta=\frac{1}{2}\log(\pi)$. Once the first log CA-CFAR threshold is computed, the cell under test sample value $\lambda_{CUT}$ may be compared to the first log CA-CFAR threshold to detect a target when the cell under test sample value $\lambda_{CUT}$ exceeds the first log CA-CFAR threshold. In selected embodiments, the disclosed methodology is used to generate an ordered statistics cell-average constant false alarm rate (OS-CA-CFAR) threshold for the compressed radar data signals. In such embodiments, a second plurality of log detector sample values is generated when the compressed radar data signals are applied to the log detector, and a second average sample value $S_{AVG}$ is computed from the second plurality of log detector sample values. In selected embodiments, the second plurality of log detector sample values is generated by applying the compressed radar data signals to the log detector to generate a plurality of log detector sample values, and then grouping the plurality of log detector sample values into the first and second plurality of log detector sample values. As disclosed herein, the plurality of log detector sample values may be grouped into the first and second plurality of log detector sample values by assigning overlapping log detector sample values from the plurality of log detector sample values into the first and second plurality of log detector sample values, assigning non-overlapping log detector sample values from the plurality of log detector sample values into the first and second plurality of log detector sample values, or randomly assigning log detector sample values from the plurality of log detector sample values into the first and second plurality of log detector sample values. In addition, a second log CA-CFAR threshold is computed by adding the second average sample value $S_{AVG}$, probability of false alarm factor $\alpha$, and log CA-CFAR correction factor $\beta$. The first and second log CA-CFAR thresholds are then sorted by magnitude to form a sorted list of log CA-CFAR thresholds, and the OS-CA-CFAR threshold is then computed by selecting a kth threshold from the sorted list of log CA-CFAR thresholds. Using the OS-CA-CFAR threshold for comparison with each sample value in the first and second plurality of log detector sample values, a target is detected when any sample value in the first and second plurality of log detector sample values exceeds the OS-CA-CFAR threshold.

In yet another form, there is provided a radar apparatus and associated method of operation. In the disclosed radar apparatus, a transmitter is configured to transmit a first transmit signal and a second transmit signal. The radar apparatus also includes a receiver that is configured to produce a digital signal from first and second transmit signal returns received in response to the first and second transmit signals. In addition, the radar apparatus includes a digital signal processor configured to compute an ordered statistics cell-average constant false alarm rate (OS-CA-CFAR) threshold. To this end, the digital signal processor is configured to generate compressed radar data signals from the digital signal. In addition, the digital signal processor is configured to apply the compressed radar data signals to a log detector to generate a first plurality of log detector sample values and a second plurality of log detector sample values. In addition, the digital signal processor is configured to generate a first log CA-CFAR threshold based on the first plurality of log detector sample values by computing a log CA-CFAR correction factor $\beta$) to adjust a sample average of the first plurality of log detector sample values of the log detector. For example, the first log CA-CFAR may be generated from the first plurality of log detector sample values by computing a first average sample value $S_{AVG1}$ from the first plurality of log detector sample values, and by adding the first average sample value $S_{AVG1}$ with a probability of false alarm factor $\alpha$ and a log CA-CFAR correction factor $\beta$ to compute the first log CA-CFAR threshold. In addition, the digital signal processor is configured to generate a second log CA-CFAR threshold from the second plurality of log detector sample values by computing a log CA-CFAR correction factor $\beta$ to adjust a sample average of the first plurality of log detector sample values of the log detector. For example, the second log CA-CFAR may be generated from the second plurality of log detector sample values by computing a second average sample value $S_{AVG2}$ from the second plurality of log detector sample values, and by adding the second average sample value $S_{AVG2}$ with the probability of false alarm factor $\alpha$ and the log CA-CFAR correction factor $\beta$ to compute the second log CA-CFAR threshold. In addition, the digital signal processor is configured to sort the first and second log CA-CFAR thresholds by magnitude to form a sorted list of log CA-CFAR thresholds. In addition, the digital signal processor is configured to compute an ordered statistics CA-CFAR threshold for the compressed radar data signals by selecting a kth threshold from the sorted list of log CA-CFAR thresholds. In selected embodiments, the digital signal processor is also configured to compare each sample value in the first and second plurality of log detector sample values to the ordered statistics CA-CFAR threshold, and to detect a target when any sample value in the first and second plurality of log detector sample values exceeds the ordered statistics CA-CFAR threshold. When generating the first and second plurality of log detector sample values, the digital signal processor may be configured to apply the compressed radar data signals to the log detector to generate a plurality of log detector sample values, and to then group the plurality of log detector sample values into the first and second plurality of log detector sample values by assigning overlapping log detector sample values from the plurality of log detector sample values into the first and second plurality of log detector sample values, assigning non-overlapping log detector sample values from the plurality of log detector sample values into the first and second plurality of log detector sample values, or randomly assigning log detector sample values from the plurality of log detector sample values into the first and second plurality of log detector sample values.

Although the described exemplary embodiments disclosed herein focus on example automotive radar circuits, systems, and methods for using same, the present invention is not necessarily limited to the example embodiments illustrate herein. For example, various embodiments of a distributed aperture radar may be applied in non-automotive applications, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A radar system, comprising:
    a radar control processing unit;
    a radio-frequency (RF) transmitter unit and first plurality of transmit antennas which are controlled by the radar control processing unit to transmit MIMO radar signals; and
    an RF receiver unit and a first plurality of receive antennas which are controlled by the radar control processing unit generate digital output signals from MIMO radar signal returns received in response to the MIMO radar signals;
    wherein the radar control processing unit is configured to:
        process the digital output signals to generate compressed radar data signals,
        apply the compressed radar data signals to a log detector to generate a first plurality of log detector sample values comprising a cell under test sample value $\lambda_{CUT}$ and a plurality of N surrounding sample values $\lambda_i$, and
        generate a first log cell-average constant false alarm rate (CA-CFAR) threshold based on the first plurality of log detector sample values by computing a first log CA-CFAR correction factor $\beta$ to adjust a sample average of the first plurality of log detector sample values generated by the log detector;
        generate a second log CA-CFAR threshold based on a second plurality of log detector sample values by computing a second log CA-CFAR correction factor $\beta$ to adjust a sample average of the second plurality of log detector sample values generated by the log detector;
        sort the first and second log CA-CFAR thresholds by magnitude to form a sorted list of log CA-CFAR thresholds; and
        compute an ordered statistics cell-average constant false alarm rate (OS-CA-CFAR) threshold for the compressed radar data signals by selecting a kth threshold from the sorted list of log CA-CFAR thresholds.

2. The radar system of claim 1, wherein the radar control processing unit is further configured to generate the first log CA-CFAR threshold by:

computing an average sample value $S_{AVG}$ from the first plurality of log detector sample values, computing a probability of false alarm factor $\alpha$ from a specified probability of false alarm, $P_{FA}$ by computing $\alpha = \log(N[P_{FA}^{-1/N}-1])$, and computing the first log CA-CFAR threshold by adding the average sample value $S_{AVG}$, probability of false alarm factor $\alpha$, and the first log CA-CFAR correction factor $\beta$.

3. The radar system of claim 1, wherein the radar control processing unit is configured to compute the first log CA-CFAR correction factor $\beta = \frac{1}{2} \log(\pi)$.

4. The radar system of claim 1, wherein the radar control processing unit is further configured to compare the cell under test sample value $\lambda_{CUT}$ to the first log CA-CFAR threshold to detect a target when the cell under test sample value $\lambda_{CUT}$ exceeds the first log CA-CFAR threshold.

5. The radar system of claim 1, wherein the radar control processing unit is further configured to generate the second log CA-CFAR threshold by:

computing a second average sample value $S_{AVG}$ from the second plurality of log detector sample values, and computing the second log CA-CFAR threshold by adding the second average sample value $S_{AVG}$, probability of false alarm factor $\alpha$, and the second log CA-CFAR correction factor $\beta$.

6. The radar system of claim 5, wherein the radar control processing unit is further configured to compare each sample value in the first and second plurality of log detector sample values to the OS-CA-CFAR threshold to detect a target when any sample value in the first and second plurality of log detector sample values exceeds the OS-CA-CFAR threshold.

7. The radar system of claim 5, where the second plurality of log detector sample values are generated by:

applying the compressed radar data signals to the log detector to generate a plurality of log detector sample values; and grouping the plurality of log detector sample values into the first and second plurality of log detector sample values.

8. The radar system of claim 7, where grouping the plurality of log detector sample values into the first and second plurality of log detector sample values comprises:

assigning overlapping log detector sample values from the plurality of log detector sample values into the first and second plurality of log detector sample values;

assigning non-overlapping log detector sample values from the plurality of log detector sample values into the first and second plurality of log detector sample values; or randomly assigning log detector sample values from the plurality of log detector sample values into the first and second plurality of log detector sample values.

9. A method for operating a radar system, comprising:

transmitting MIMO radar signals from transit antennas in a plurality of transmit and receive antennas;

receiving MIMO radar signal returns at receive antennas in the plurality of transmit and receive antennas;

processing the MIMO radar signal returns to generate compressed radar data signals;

applying the compressed radar data signals to a log detector to generate a first plurality of log detector sample values;

generating a first log cell-average constant false alarm rate (CA-CFAR) threshold from the first plurality of log detector sample values by computing a first log CA-CFAR correction factor $\beta$ to adjust a sample average of the first plurality of log detector sample values generated by the log detector;

generating a second log CA-CFAR threshold based on a second plurality of log detector sample values by computing a second log CA-CFAR correction factor $\beta$ to adjust a sample average of the second plurality of log detector sample values generated by the log detector;

sorting the first and second log CA-CFAR thresholds by magnitude to form a sorted list of log CA-CFAR thresholds; and computing an ordered statistics cell-average constant false alarm rate (OS-CA-CFAR) threshold for the compressed radar data signals by selecting a kth threshold from the sorted list of log CA-CFAR thresholds.

10. The method of claim 9, wherein computing the first log CA-CFAR threshold comprises:

retrieving a plurality of N sample values $\lambda_i$ from the first plurality of log detector sample values which surround a cell under test sample value $\lambda_{CUT}$ in the first plurality of log detector sample values; and computing the average sample value $$S_{AVG} = \frac{1}{N} \sum_{i=1}^{N} \lambda_i.$$

11. The method of claim 10, wherein computing the first log CA-CFAR threshold comprises:

retrieving a specified probability of false alarm, $P_{FA}$;

computing $\alpha = \log(N[P_{FA}^{-1/N}-1])$; and adding the average sample value $S_{AVG}$, probability of false alarm factor $\alpha$, and the first log CA-CFAR correction factor $\beta$ to compute the first log CA-CFAR threshold.

12. The method of claim 11, wherein computing the first log CA-CFAR correction factor $\beta$ comprises computing $\beta = \frac{1}{2} \log(\pi)$.

13. The method of claim 12, further comprising:

comparing the cell under test sample value $\lambda_{CUT}$ to the first log CA-CFAR threshold; and detecting a target when the cell under test sample value $\lambda_{CUT}$ exceeds the first log CA-CFAR threshold.

14. The method of claim 9, wherein generating the second log CA-CFAR threshold includes:

computing a second average sample value $S_{AVG}$ from the second plurality of log detector sample values; and computing the second log CA-CFAR threshold by adding the second average sample value $S_{AVG}$, probability of false alarm factor $\alpha$, and the second log CA-CFAR correction factor $\beta$.

15. The method of claim 14, further comprising:

comparing each sample value in the first and second plurality of log detector sample values to the OS-CA-CFAR threshold; and detecting a target when any sample value in the first and second plurality of log detector sample values exceeds the OS-CA-CFAR threshold.

16. The method of claim 14, where generating the second plurality of log detector sample values comprises:

applying the compressed radar data signals to the log detector to generate a plurality of log detector sample values; and grouping the plurality of log detector sample values into the first and second plurality of log detector sample values.

17. The method of claim 16, where grouping the plurality of log detector sample values into the first and second plurality of log detector sample values comprises:
assigning overlapping log detector sample values from the plurality of log detector sample values into the first and second plurality of log detector sample values;
assigning non-overlapping log detector sample values from the plurality of log detector sample values into the first and second plurality of log detector sample values; or
randomly assigning log detector sample values from the plurality of log detector sample values into the first and second plurality of log detector sample values.

18. A radar apparatus, comprising:
a transmitter configured to transmit a first transmit signal and a second transmit signal;
a receiver configured to produce a digital signal from first and second transmit signal returns received in response to the first and second transmit signals; and
a digital signal processor configured to:
generate compressed radar data signals from the digital signal;
apply the compressed radar data signals to a log detector to generate a first plurality of log detector sample values and a second plurality of log detector sample values;
generate a first log cell-average constant false alarm rate CA-CFAR threshold based on the first plurality of log detector sample values by computing a first log CA-CFAR correction factor $\beta$ to adjust a sample average of the first plurality of log detector sample values generated by the log detector;
generate a second log CA-CFAR threshold based on the second plurality of log detector sample values by computing a second log CA-CFAR correction factor $\beta$ to adjust a sample average of the second plurality of log detector sample values generated by the log detector;
sort the first and second log CA-CFAR thresholds by magnitude to form a sorted list of log CA-CFAR thresholds; and
compute an ordered statistics cell-average constant false alarm rate (OS-CA-CFAR) threshold for the compressed radar data signals by selecting a kth threshold from the sorted list of log CA-CFAR thresholds.

19. The radar apparatus of claim 18, where the digital signal processor is further configured to:
compare each sample value in the first and second plurality of log detector sample values to the OS-CA-CFAR threshold; and
detect a target when any sample value in the first and second plurality of log detector sample values exceeds the OS-CA-CFAR threshold.

20. The radar apparatus of claim 18, where the digital signal processor is configured to apply the compressed radar data signals to the log detector to generate the first and second plurality of log detector sample values by:
applying the compressed radar data signals to the log detector to generate a plurality of log detector sample values; and
grouping the plurality of log detector sample values into the first and second plurality of log detector sample values by:
assigning overlapping log detector sample values from the plurality of log detector sample values into the first and second plurality of log detector sample values;
assigning non-overlapping log detector sample values from the plurality of log detector sample values into the first and second plurality of log detector sample values; or
randomly assigning log detector sample values from the plurality of log detector sample values into the first and second plurality of log detector sample values.

* * * * *